US010075844B2

United States Patent
Fong et al.

(10) Patent No.: US 10,075,844 B2
(45) Date of Patent: Sep. 11, 2018

(54) ENPOINT SECURITY APPLIANCE/SENSOR PLATFORM

(71) Applicant: PPIP LLC, Tempe, AZ (US)

(72) Inventors: Michael Fong, Chandler, AZ (US); Teddy David Thomas, Bedford, NH (US); Harald Quintus-Bosz, Sudbury, MA (US); Piotr Diduch, Billerica, MA (US); Kenneth Alan Ritsher, Lowell, MA (US); Gabriel Greeley, Somerville, MA (US); Neric Fong, Portola Valley, CA (US); Morton Tarr, Bolton, MA (US); Blake Edward Kotiza, Scottsdale, AZ (US)

(73) Assignee: PPIP LLC, Tempe, AZ (US)

( * ) Notice: Subject to any disclaimer, the term of this patent is extended or adjusted under 35 U.S.C. 154(b) by 0 days.

(21) Appl. No.: 15/384,027

(22) Filed: Dec. 19, 2016

(65) Prior Publication Data

US 2017/0180984 A1 Jun. 22, 2017

Related U.S. Application Data

(60) Provisional application No. 62/269,733, filed on Dec. 18, 2015.

(51) Int. Cl.
*H04W 12/02* (2009.01)
*H04W 12/08* (2009.01)

(52) U.S. Cl.
CPC .......... *H04W 12/02* (2013.01); *H04W 12/08* (2013.01)

(58) Field of Classification Search
CPC .............................. H04W 12/06; H04W 12/08
See application file for complete search history.

(56) References Cited

U.S. PATENT DOCUMENTS

| | | | |
|---|---|---|---|
| 2012/0215519 A1* | 8/2012 | Park | G06F 17/289 704/2 |
| 2013/0275873 A1* | 10/2013 | Shaw | G01S 3/8006 715/716 |

* cited by examiner

*Primary Examiner* — Diane Mizrahi
(74) *Attorney, Agent, or Firm* — Ronald S. Fernando

(57) ABSTRACT

Some embodiments include a privacy/security apparatus for a portable communication device that includes a housing assembly configured to attenuate acoustic and light energy, and an audio channel comprising a microphone and speaker that can play input derived primarily from either the microphone or from a different audio source. The privacy/security apparatus includes a Digital Signal Processor (DSP) that can receive the input from the microphone and provide the input to the speaker or process the microphone input prior to providing speaker, and seed to generate a masking signal provided to one or more speakers with an output that is played to one or more microphones of a portable communication device. Further, the privacy/security apparatus includes a microprocessor configured and arranged to: i. load software on the DSP, and ii. provide control of a user interface that controls at least some functions of the apparatus.

26 Claims, 12 Drawing Sheets

ENPOINT SECURITY APPLIANCE/SENSOR PLATFORM

RELATED APPLICATIONS

This application claims priority to U.S. Provisional Patent Application Ser. No. 62/269,733, filed on Dec. 18, 2015, the entire contents of which are incorporated herein by reference.

BACKGROUND

Electronic devices are proliferating at a prodigious rate. In 2004, there were no smartphones and now there are over two billion. Besides traditional computing devices such as computers, laptops, tablets and gaming consoles, information gathering, processing and signaling capabilities are being added to billions of other devices, from household appliances to TV's, cars, toys and everything in between (the Internet of Things). Sensors of innumerable shapes, sizes and capability are being developed and deployed for every conceivable purpose, from tracking people's health and activity to monitoring the environment, tracking goods and shipments, monitoring consumption and use of food, bandages, money as well as almost anything else imaginable. Virtually the entire world and reachable space is being instrumented and monitored.

All of the aforementioned endpoints/devices/sensors have some level of storage, transmission or interconnection capability and rely on some combination of hardware and software to deliver part or all of their functionality. Just as the number of these endpoints are exploding, so are the number of hacks and unauthorized uses of these devices. In addition, many endpoints or the software that runs on them (apps on computers, tablets or smartphones as an example) gather information with or without the willing knowledge or participation of their users or the people around them. Consumers rarely read the terms and conditions which are presented to them and if they wish to use popular apps, their only option is usually to accept such terms and conditions, further enabling over-reaching apps.

Accordingly, there is a growing need to provide individuals, business and governments with the ability to control their privacy and information security. Any new hardware and/or software that provides this protection can be used as a platform to provide a wide variety of additional functions or services that further enhance the utility, features and functions of the associated endpoints/devices or provide entirely new functionality, such as a distributed sensor network. Further, the platform can provide a high level of security for a secure facility, and enable users to access at least some functionality based on a specified level of security/control.

SUMMARY

Some embodiments include a privacy/security apparatus for a portable communication device comprising: a. a housing assembly configured to at least partially attenuate at least one of acoustic and light energy, and b. at least one audio channel comprising a microphone and speaker, the speaker being configured and arranged to play input derived primarily from either the microphone or from a different audio source, and c. a Digital Signal Processor (DSP). Further, the DSP is configured and arranged to: i. receive the input from the microphone and provide the input to the speaker or process the microphone input prior to providing speaker; and ii. use a seed to generate a masking signal provided to one or more speakers comprising an output that is played to one or more microphones of a portable communication device. Further, the privacy/security apparatus comprises at least one microprocessor configured and arranged to: i. load software on the DSP, and ii. provide control of a user interface that controls at least some functions of the apparatus.

Some embodiments include a privacy/security apparatus further comprising an interface for a module which provides additional capabilities for the apparatus. In some embodiments include a module comprising a subscriber identity module. In some further embodiments, the microprocessor captures the state of switches/buttons. In other embodiments, the microprocessor captures battery status. In some further embodiments, the microprocessor controls at least one visual feedback system. In other embodiments, the visual feedback system includes at least one LED.

In some embodiments, the privacy/security apparatus further comprises one or more user actuated buttons, slides, or shutters configured to control the type of signal played to a least one microphone on a protected mobile device. In other embodiments, the one or more user actuated buttons, slides, or shutters are configured cover and uncover at least one camera on the protected device. In some embodiments, the privacy/security apparatus further comprises at least one switch configured to detect the use of at least one shutter for a camera. In other embodiments, the at least one switch is further configured to automatically change the input played to a microphone on a protected device.

In some embodiments, the privacy/security apparatus further comprises at least one LED or visual signaling method to indicate the state or status of features of the privacy/security apparatus. In other embodiments, the privacy/security apparatus further comprises at least one wired or wireless connection configured to allow information to pass to or from the privacy/security apparatus and a protected device. In other embodiments, the privacy/security apparatus further comprises a mechanical/electrical connection configured and arranged for coupling at least one module to the privacy/security apparatus, the connection enabling: i. Power to pass to and/or from the module and the privacy/security apparatus; and ii. Data to pass to and/or from the module and the privacy/security apparatus.

In some embodiments, the at least one module utilizes the mechanical/electrical connection to couple components of the privacy/security apparatus. In other embodiments, the components comprise one or more of: a. A blank module to fill any open space that may be taken by a module; b. A module configured to provide extra battery power to a portable communication device, the privacy/security apparatus or to one or more separate devices; and c. A module to detect Radio Frequency transmissions.

In some embodiments, the housing assembly includes an articulating assembly configured and arranged to articulate a portion of the housing assembly to one or more positions to enable a user to insert or enclose and remove the portable communication device. In other embodiments, the housing assembly includes a sliding assembly configured and arranged to slide a portion of the housing assembly to one or more positions to enable a user to insert, enclose or remove the portable communication device.

In some embodiments, the housing assembly includes one or more separate and distinct parts/components, together which integrate and connect into a complete assembly enclosing the portable communication device. In some further embodiments, the privacy/security apparatus comprises at least one microphone configured to listen to the mask noise generated by the privacy/security apparatus. In some embodiments, the microprocessor is configured to set parameters of a battery charge system. In other embodiments, the microprocessor is configured to control the power state of one or more components of the privacy/security apparatus.

In some embodiments, the DSP is configured to filter/sculpt audio (voice or mask noise) to compensate for microphone, speaker and cavity response. In other embodiments, the DSP is configured to analyze ambient audio to determine optimum mask profile. In some further embodiments, the DSP is configured to morph voice to obfuscate identity while maintaining intelligibility. In other embodiments, the DSP is configured to apply a frequency mask.

DETAILED DESCRIPTION

Figure 1:
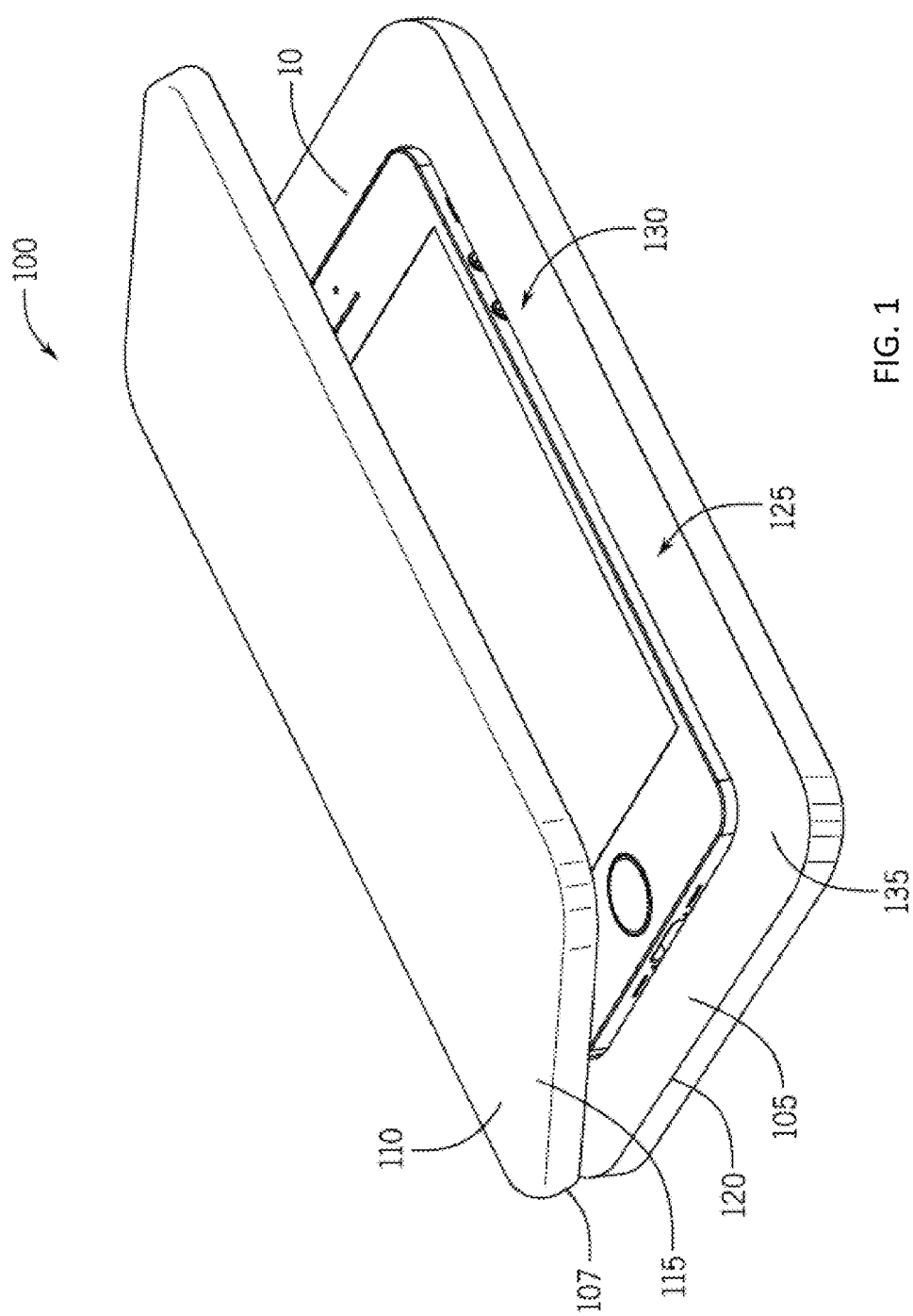
FIG. 1 illustrates secure/private communication between user devices secured and protected in secure/privacy enclosures in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The use of the singular term "and" or "or" when used with a series of items, capabilities, features or functions is meant to include "and" and "or" ("and/or"). The use of the term "sensor" or "sensors" is meant to encompass anything that detects events and/or changes in an environment or otherwise detects, captures and/or gathers data/information, be it a standalone device/system, an integrated device/system or some/all sub-elements or components of a system performing such a function. For example, the use of the term "RF (radio frequency) sensor" encompasses anything capable of detecting RF energy, including things such as a software defined radio, an oscilloscope or spectrum analyzer and/or a series of integrated circuits and/or analog or digital systems or components, including antennas, RF integrated circuits, modems and digital baseband processors to name a few.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention described herein include privacy/security/communication devices, privacy/security/communication systems and methods of use of these devices and systems for providing or facilitating a user's privacy/security/communication/utility. Unless specified or limited otherwise, the term "endpoint security appliance and platform" (and also called herein "ESAP") will be used throughout to describe embodiments of a structure forming at least a partial enclosure, chamber, cover, case, sleeve, channel, conduit, window, attachment and/or variations, add-ons, plug-ins, inserts and/or sub-attachments and/or associated devices thereof to broadly encompass rendering a range of levels of privacy/security/communication or other function to a user, owner, manager, service provider, or other party (i.e. corporate IT, human resource, legal, security or other such department, function, agency, command, parent device or monitoring and/or management system etc.).

In some embodiments, the protective enclosure may be carried by, integrated with, placed on or otherwise paired or used in conjunction with other devices. For example, in some embodiments, the enclosure may be installed in an automotive console or in other portions of automotive vehicles. In some embodiments, the enclosure may be installed in other forms of transportation, in clothing, in desks and/or office furniture, in appliances and/or home furnishings, in travel bags, etc. In some embodiments, the connection to the enclosure can be manual, while in others it can be remotely or automatically activated/connected. For example, in one embodiment, a user can place their mobile device (or other protected device) inside the enclosure integrated into the console of a car, subsequently either manually or automatically connecting/disconnecting at least some specific pass-through capabilities of the enclosure based on the desired functionality. For example, in an example embodiment, if a user requires total protection, elimination of distracted driving, and/or location tracking (which may be used by insurance companies for underwriting purposes, stalkers or abusers, etc.). In other embodiments, the user may desire a pass-through connection allowing the protected device to share its screen on the dashboard, and/or to access music or other apps on the device, while still having some or all other protections enabled (e.g., audio hamming, power/charging, RF shielding, preventing calls or text messages from coming in), and deriving the benefits of other capabilities of the protected device.

In reference to at least FIG. 1, in some embodiments, the ESAP can comprise a device (ESAP enclosure 100) including a housing assembly that can comprise a rigid or semi-rigid, structurally self-supporting device that can be at least partially opened or closed by a user, and/or can include a portion that can be activated, moved, adjusted, opened or closed by a user to adjust a level of privacy/security/communication. In some embodiments, at least a portion of the housing assembly can be moved with respect to another portion of the housing assembly. In some embodiments, the ESAP can include a structure that can least partially envelop at least one user device comprising an RF transceiver and/or an audio device, and/or a video device, and/or an audio/video/RF protection device, and/or a near-field communication (hereinafter "NFC") device, and/or a radio-frequency identification (hereinafter "RFID") device. For example, in some embodiments, the ESAP can be used to cradle, and temporarily or permanently store at least one user device such as a smart phone, or other communication device.

In some embodiments, the ESAP can include at least one gasket or O-ring (hereinafter referred to as an "RF gasket") that is capable of at least partially attenuating or blocking at least one transmission or signal comprising radio frequency radiation (hereinafter referred to as "RF"). Further, in some embodiments, the ESAP can be formed of a material capable of at least partially attenuating RF radiation emitted to or from any RF antennas or transceivers positioned inside the privacy/security enclosure (e.g., such as those forming part of the user's smart phone).

In some embodiment, the ESAP enclosure 100 can comprise a clam-shell type enclosure including an inner region 105 formed by coupling a lower portion, and an upper portion of a main housing 110. Some embodiments include at least one user device (such as the RF transceiver comprising a smart phone as depicted, and shown as device 10) positioned in the inner region 105. The ESAP enclosure 100 can cradle the user device, and the upper portion can at least partially enclose one or more devices by at least partially moving and closing a base portion 120 and a lid portion 115. In some embodiments, the ESAP enclosure 100 can include a base portion 120 and a lid portion 115 coupled by at least one pivot. For example, in some embodiments, the ESAP enclosure 100 can include a base portion 120 and a lid portion 115 coupled by at least one conventional hinge mechanism 107. In some embodiments, the base portion or the lid portion can be shaped to accommodate at least a portion of a hinge mechanism 107. In some embodiments, one or more edges of the base portion 120 can include at least one notch capable of providing clearance for a pivot mechanism. In some embodiments, the base portion 120 or lid portion 115 or both can include a plurality of notches for providing clearance or for attachment of various portions of a pivot mechanism.

Further, in some embodiments, the base portion 120 or lid portion 115 or both can include a plurality of apertures for providing attachment of various portions of a pivot mechanism. For example, in some other embodiments, one or more surfaces of the base portion 120 and/or one or more surfaces of the lid portion 115 can include at least one aperture capable of securing one or more components of the ESAP enclosure 100. In some embodiments, any one of the above-mentioned apertures can include an attachment member (e.g., a screw, rivet or other coupling structure). In some embodiments, the privacy/security enclosure 100 can include a liner 130 that can be shaped to fit substantially seamlessly from the outer periphery of the base, and can include at least one inner storage cavity. For example, in some embodiments, the liner 130 can include a storage cavity 135 shaped to cradle an RF transceiver (device 10). The example embodiment shown in FIG. 1 includes a storage cavity 130 positioned substantially centrally within the base portion 120, and shaped to cradle and at least partially surround the device 10. In some embodiments, the liner 130 can comprise RF and/or acoustic shielding material forming a sealing interface 125. In some embodiments, the base portion 120 and lid portion 115 can be coupled and pivoted with respect to each other to enable at least partial access to an inner region 105 of the ESAP enclosure 100 by opening to an angle of between about 0° to about 90°.

Figure 2:
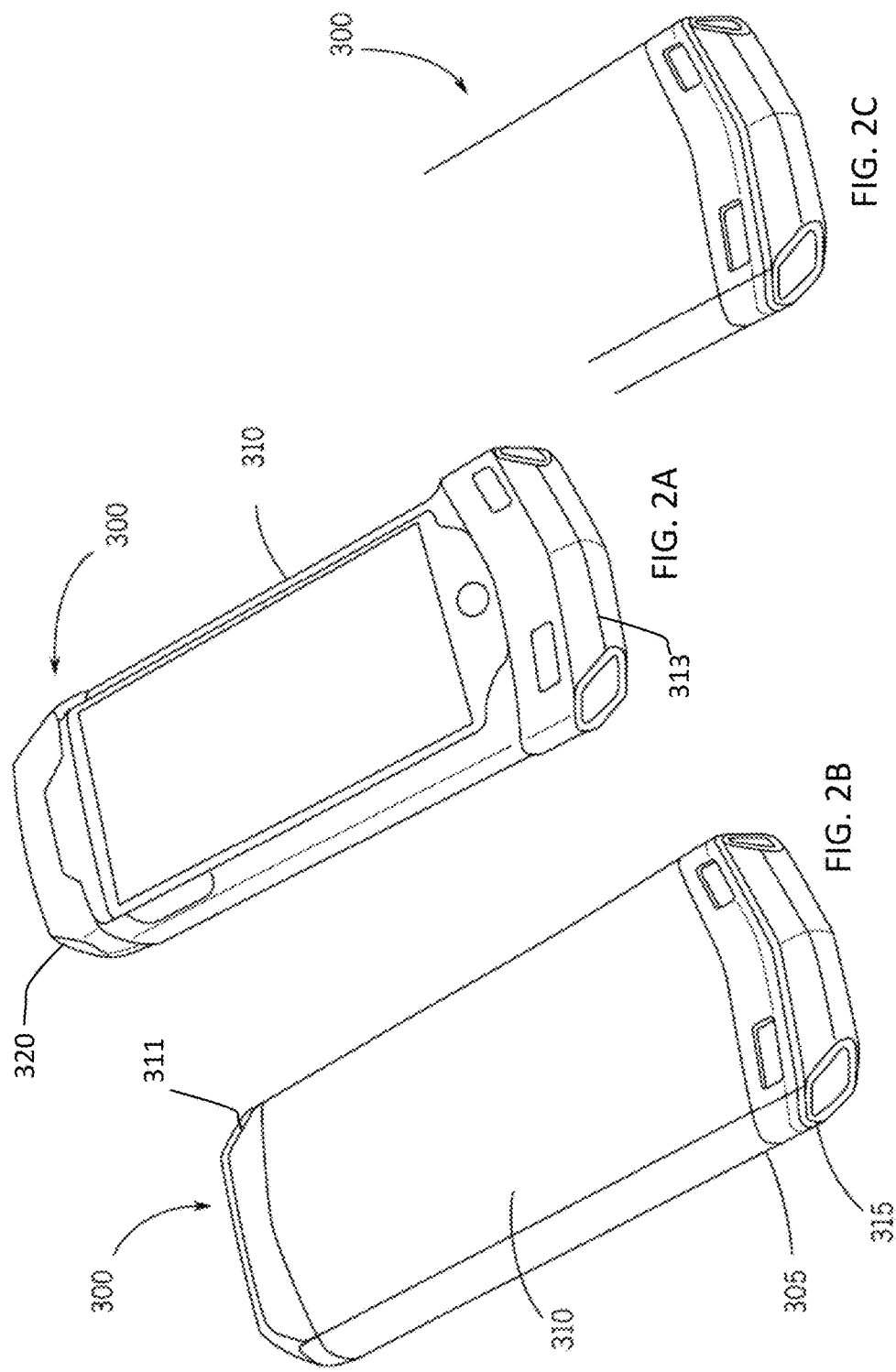
FIGS. 2A-2C illustrate views of an ESAP in accordance with some embodiments of the invention.

Referring to at least FIGS. 2A-2C, in some embodiments of the invention, the ESAP device 300 can comprise a housing assembly 305 including the cover 310, and/or the base 315, and/or the hood 320 can include at least one sliced, carved, and/or angular face or surface. For example, in some embodiments, two or more sliced, carved, and/or angular faces can be coupled to at least one other surface with an edge such as edges 311, 313. In some embodiments, the surface or edge can comprise a hard or substantially abrupt edge surface (providing a sliced-off appearance). In some other embodiments, the edge can comprise a soft or substantially curved or rounded edge surface. In some further embodiments, the two or more sliced, carved, and/or angular faces can form a portion of the housing assembly 305 providing a sliced-off appearance.

Figure 3:
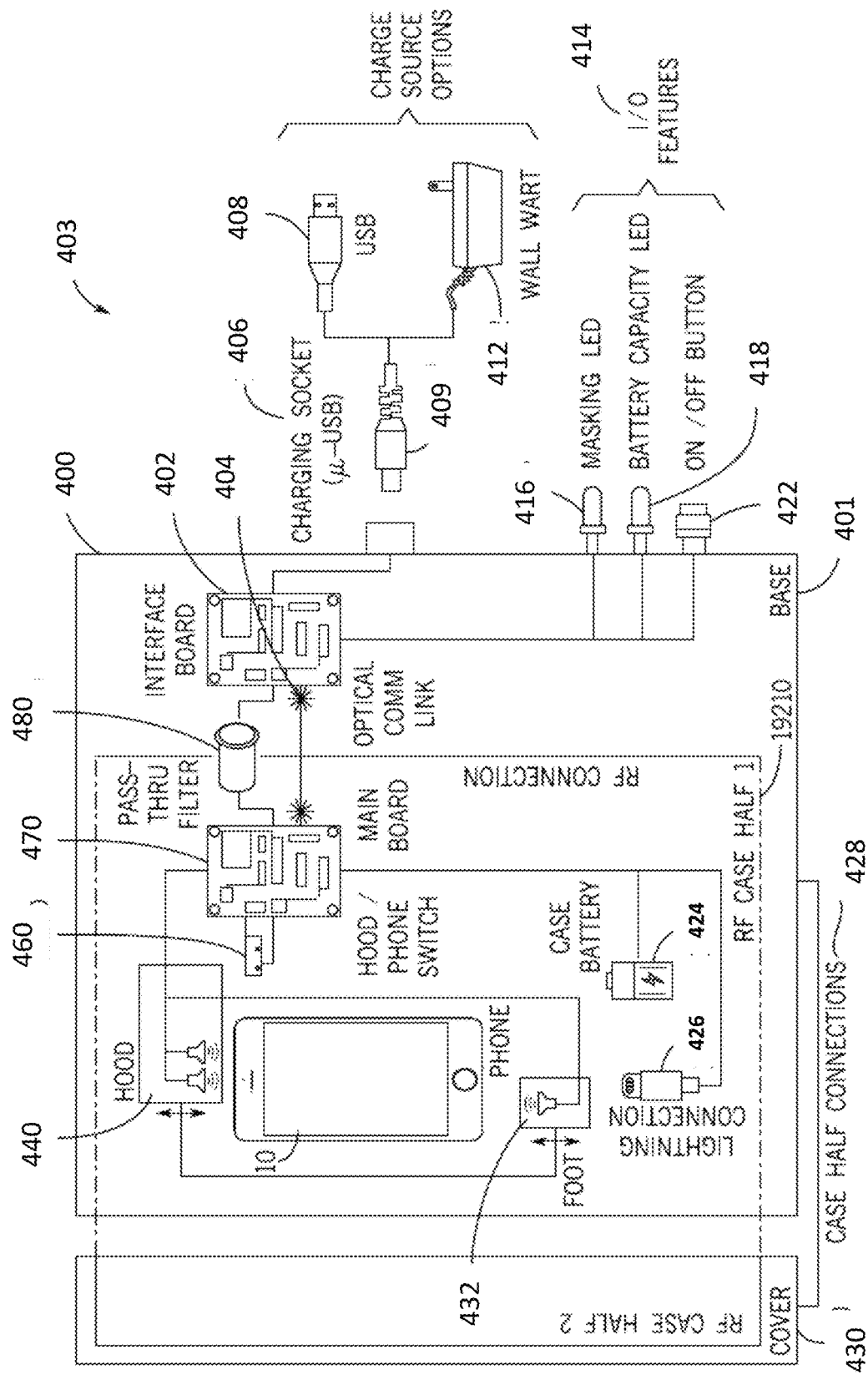
FIG. 3 illustrates an ESAP in accordance with some further embodiments of the invention.

In some embodiments, any of the ESAP enclosures described herein can include the circuit layout shown in FIG. 3. FIG. 3 illustrates a circuit system layout 400 that can be used in any of the ESAP enclosures described herein. As illustrated, the circuit system layout 400 can comprise a RF case half section 410, base circuitry and connections 401, case half connections 428 including cover 430, hood 440, and miscellaneous external connections 403. In some embodiments, the circuit system layout 400 can comprise an interface board 402, main board 470 with optical communication 404, case battery 424, and Lightning® connector 426. In some embodiments, connections can comprise charging socket 406, USB connector 408, power plug 409, power socket 412, and/or i/o features 414.

In some embodiments, visual indicators and/or masking functions can comprise masking LED 416, and battery capacity LED 418. In some embodiments, other components include foot speaker 432, hood/phone switch 460, and pass-through filter 480. In some embodiments, the pass-through filter 480 can allow the transmission of specific frequencies while filtering and/or attenuating others. In some further embodiments, the pass-through filter 480 can allow the passage of a physical wire through the surface of the Faraday cage, while not materially degrading the RF attenuation capabilities of the Faraday cage. Further, in some embodiments, the boards 402, 470 can be coupled using at least one optical communication link 404, configured to communicate in such a way that does not materially degrade the RF attenuation of the Faraday cage through which the communication is passing.

In some embodiments, a hood 440 and/or enclosed device detection switch (460) can be coupled to the main board 470. Further, in some embodiments, the hood 440 and/or a bottom, foot and/or other portions of the ESAP enclosure (e.g., components 401, 410, 430) can comprise one or more sound generators (e.g., speakers). Further, some embodiments include the battery 424 coupled to the main board 470 and/or a Lightning® connector 426, USB, micro-USB, and/or other type of power connector coupled to the main board 470. In some embodiments of the invention, the interface board 402 is coupled to a charging socket 406, and input/output features such as a masking LED 416, a battery capacity LED 418, and an on/off button 422. In some embodiments, the charging socket 406 can be coupled to a USB connector 408 and/or a wall charger 412.

In some embodiments, the DCP can be configured to allow certain frequencies to pass, while attenuating others. For example, in some embodiments, the DCP can be configured to pass a specific band of frequencies such as the those used by USB-C or other such data connector, and can pass data at a frequency in the 10 GHz or other frequency range, without materially reducing the level of RF attenuation provided in certain other frequencies.

In some embodiments of the invention, the ESAP can have the ability to serve as or house/support one or more of the factors in a multi-factor authentication system. Some embodiments include single token or multiple tokens housed in, attached to, coupled to or otherwise part of and/or integrated with the ESAP. Some other embodiments include completely freestanding or independently operating tokens (i.e. for example, in some embodiments of the invention, a token generating a security code can be housed or contained in and/or coupled or attached to the ESAP.)

Some embodiments of the invention include an ESAP that can provide functionality above and beyond that inherent in the protected device or devices. In some embodiments, the functionality can be provided by the ESAP itself, using its own hardware, software and/or in conjunction with a contained, protected or associated device's hardware and/or software (e.g., a device physically or logically connected and/or interacting/working with the ESAP). In some embodiments, the functionality can be provided by one or more separate, contained or associated devices that communicate with, attach and/or are housed by or within the ESAP.

In some embodiments, the ESAP can provide one or more modular slots, ports, housings or connections (physical or wireless) that can allow the ESAP manufacturer or third parties to provide desired functionality. In some embodiments, the slots, ports, housing or connection, and the components and/or devices which attach or communicate to them can provide capabilities or functions to the add-ons, attachments, the ESAP itself or to protected or external devices.

For example, in some embodiments, the capabilities or functions can include power, including to/from attachments and/or to/from protected, associated or non-associated/independent devices. Further, in some embodiments, the capabilities or functions can include communication capabilities to the ESAP, other add-ons to the ESAP using other slots, ports, housings or connections within the ESAP, to external devices and/or to devices protected, contained, associated or attached to the ESAP (e.g., smartphones, tablets, laptops and other electronic devices), or to some or all combinations of the above.

In some embodiments, the capabilities or functions can include communication that can be provided via direct connection such as a shared bus or network, point-to-point connections within the ESAP or to any device protected by the ESAP (e.g. a connection via a microUSB, USB, Lightning® or other such direct connection), or external to the ESAP (e.g. a USB, Lightning®, Ethernet or other such connection).

In some embodiments, the capabilities or functions can include wireless functions or communication (e.g. cellular, WiFi®, Bluetooth®, RFID, NFC, microwave, millimeter wave, infrared, LED or optical, audio or other). In some embodiments, the capabilities or functions can include processing capability (all types including data, audio, video etc.), storage and memory capability (all types including one time or multiple read/write, erasable, permanent, fixed, removable, etc.) In some embodiments, the capabilities or functions can include a display capability including, but not limited to, a screen built into or attached to or able to be added to or near the ESAP, and/or projected by the ESAP. In some embodiments, the capabilities or functions can include input capabilities (keyboard, audio, video, etc.)

In some embodiments, the capabilities or functions can include environmental protection or monitoring capabilities. In some further embodiments, the capabilities or functions can include sensors (all types). In some embodiments, one, more or all of the aforementioned capabilities can be provided for one, more or all of the internal, add-on and/or external device. For example, some embodiments include an integrated way (i.e. one common system), and other embodiments include an isolated way (i.e. a separate system of power and other such functionality for one or more add-ons, attachments, internal or external devices). For example, in some embodiments, core ESAP protective functions can have their own PCBA's and power to prevent them from being accessible or hacked/impacted by systems that can have RF or other such communication capabilities.

Further, in another example embodiment, individual add-on slots can be isolated from each other, or multiple groups of slots/ports can be linked (while still being on a separate system from other single or groups of add-on slots/ports or external systems). In some embodiments, communication (wired or wireless) can proceed with the ESAP, but not housed or attached to the ESAP (i.e. an external device).

In some embodiments, the capabilities or functions can be provided by a combination of the ESAP, an external device, and/or devices protected by the ESAP. In some embodiments, the capabilities or functions can be provided by other or additional functionality including, but not limited to, providing one or more of the factors in a multi-token authentication system/capability. Some embodiments provide a slot for an RSA Security LLC token or other token or similar device. In some embodiments, financial services companies or other entities can use this device instead of sending SMS text messages as a second form of authentication. Some embodiments provide a slot for other tokens (those that are now or are in the future being rolled out to replace keys electronic locks, key/security cards, other access or functionality control mechanisms, etc.). Some other embodiments provide a software-based or multi-token capability (i.e., allowing multiple banks or other entities to share a common token).

Some embodiments can embed token or other such security or authentication capabilities within the ESAP itself or via an associated device. Some embodiments of the invention provide a screen on which one or more add-on tokens can display their authentication codes (where the screen may be used for other purposes). Some embodiments can provide continuous authentication capabilities such as user and/or identity verification via gait, motion, biometric, vibration and/or other combinations of other data gathering and analysis capabilities.

Some embodiments can provide an application or data verification function/capability. For example, some embodiments provide an integrated or add-on device that provides a signature for known applications. Some embodiments can provide an add-on that has a known signature (e.g., a hash of the code etc.) that can be used to verify that the application running on the protected device (e.g., phone, tablet, laptop, computer, etc.) is provided by the original publisher. Some embodiments of the invention can create a communication link between the ESAP and/or the add-on and any number of protected devices (via one of the aforementioned communication methods). For example, some embodiments can link to an iPhone® via the Lightning® connector or via a wireless network or connection and interact with software running on the phone to verify that one more or all of the applications running on the phone are verified via the hash signature provided by their software publisher (whether an external application or an application written by the company/governmental entity). Further, some embodiments provide wireless access for the ESAP or add-on to periodically receive updated signature databases or files. Some embodiments also centralize the signature databases and can have the ESAP and/or the add on reach out and check the central database for the most current signature depending on the version being run on the specific protected devices.

Some embodiments can provide a communication monitoring/security system/capability. For example, some embodiments of the invention include an ESAP that can provide a WiFi® hotspot or other wireless capability that, working with or without software on the protected device, can enable at least some communication (e.g. data, voice, video, communication, etc.) being monitored by, going through and/or being rebroadcast by the ESAP while being monitored for malicious or other types of inbound and/or outbound traffic. Different types of information (i.e. credit cards, Social Security Numbers, account numbers, etc.) can be provided and a variety of functions can be performed on these types of data streams including shunting, stopping, changing/modifying, logging and/or deleting such information/data. In some embodiments, at least some of these functions that are commonly provided by corporate network or software/application security systems (e.g. firewalls, intrusion prevention/protection systems, anti-virus, intelligent monitoring and identification systems, pattern recognition and behavioral analysis systems etc.) can be provided by the ESAP to specific protected and/or associated devices on an end point by end point basis.

Some embodiments provide some or all of the same functionality outlined in the preceding paragraph for any or all other forms of wired or RF/wireless communication. In some embodiments, the ESAP can be positioned between a protected device and the communication destination, allowing visibility, control and reporting of such communication streams. In some embodiments, certain forms of communication can be controlled, prevented, degraded or interfered with such that other networks/communication methods can be preferred or forced to be used. In some embodiments, at least some of these capabilities can be implemented in the ESAP, and/or by an attached or associated device. In some further embodiments, at least some of these capabilities can be implemented via software on the ESAP, the protected or associated devices, or attachments, or via integration and interaction with software that provides or can influence such behavior, policies or results (i.e. mobile device management software, security software, application software, operating system software, firmware etc.).

Some embodiments provide a partial or full lock/unlock and/or activate/deactivate function/capability. For example, in some embodiments, the ESAP, add-on and/or sub-components of the ESAP can provide a physical, logical or biometric system that the user must correctly activate to unlock one, more or all of the functions/capabilities of the ESAP or of the protected device. For example, given that devices can be hacked and information or processing power used when not authorized, in some embodiments, the ESAP can prevent any information from being transmitted or any of innumerable other functions or transmissions from occurring without the user of the ESAP unlocking and authorizing the device based on any variety or combination of passwords, biometric features and/or with or without some other type of authentication system.

Some embodiments include providing a data filtering or screening capability. In some embodiments, corporate, government and/or any other type of users (individuals such as parents, etc.) can use the ESAP to allow or restrict access to certain websites, IP addresses, regions, allow or restrict access connection points/services/devices (e.g. corporate or other VPN services etc.), allow or restrict access different types of traffic (i.e. restricting access to mature content, etc.) and/or allow or restrict access to different types of data (e.g., restrict sensitive files or data such as customer account or SSN information).

Some embodiments provide integrated and/or secure communication capabilities. For example, in some embodiments, the ESAP or its add-ons can be used to communicate with and integrate into business/personal communication or management systems. For example, in some embodiments, the ESAP can log into and check with one or more analog or digital phones, call centers, or system management systems (i.e. manual and/or automated systems that provide monitoring, communication, command or control capability for voice and data networks, internal and external including cloud based IT systems and services etc.) In some further embodiments, the ESAP can log into and check with systems to alert, report and/or interact with such systems, where, for example, and any protected/associated devices are on site, are requesting certain services or are or want to perform certain functions etc.) As one non-limiting example embodiment, once registered, an IP phone system can be used to communicate operating instructions to the ESAP, route calls to specific IP addresses or protected devices, and/or provide any other function that a normal protected device such as a mobile phone might not be normally able to do within the context of the existing system.

In some embodiments, the ESAP can provide secure communications between protected devices or to a device or devices that are part of the integrated system (e.g. the corporate/government phone system). Some embodiments can provide a reporting/certification function/capability. For example, in some embodiments, the ESAP or add-on can report compliance, alerts and/or other such information to corporate, government or individual monitoring, alert, management, compliance and/or other systems.

Some embodiments can provide context-based information, reporting, control and decision making. For example, in some embodiments, the ESAP and or the capabilities it provides either natively and/or via add-ons, attachments or associated and/or protected devices can capture and track contextual information. In some embodiments, the contextual information can be location, time of day, state information of any element of the ESAP or associated component, user information, communication types, amounts and to or from destinations, application usage and behavior, speed of movement, environmental data (e.g. temperature, altitude, humidity, light levels, RF environment etc.) and other such information.

Some embodiments include processing, reporting and/or communicating some or all information to protected or associated hardware or software and/or to $3^{rd}$ party entities or systems or to central or shared systems and/or aggregation and/or collection systems (e.g. a SAAS service platform in the cloud, a corporate, government and/or service provider monitoring or management system etc.) In some embodiments, the ESAP can make decisions or take actions based on local and/or non-local contextual and other information (e.g. previously or concurrently gathered, provided, developed or housed in associated devices and/or remote systems) or at the direction of and/or with the input/collaboration of non-local systems, software, devices or data. In some embodiments, such decisions or actions can be based on rules, thresholds, boundaries or some other such criteria. In some embodiments, the decision or action criteria may have been previously established, developed and/or configured and/or it can be recently or dynamically determined, with the criteria being available locally and/or with an associated device/system or being accessed remotely (i.e. a remote management system that, if/when possible, provides remote control, direction, criteria, rules and behaviors etc.).

In some embodiments, examples of context-based decisions can include things such as allowing, preventing and/or modifying or reporting on certain types of access, communication, features and/or functions based on things such as identity, location, time of day, type of traffic and/or application being used, similarity (or not) to prior behaviors or profiles, type of system being accessed or communicated with or other such contextual information.

In some embodiments, the ESAP can provide subscriber identity module (SIM) (or any other card, device, chip, circuit or other such component that provides identity, authentication, encryption key and/or other such functions required to establish and/or maintain communication capabilities for mobile devices) management, replacement, monitoring, supplementation, housing, swapping, manipulation, configuration and/or other such capabilities. In some further embodiments of the invention, the ESAP can include/provide components that allow for the replacement of the SIM card and SIM card tray/holster with another SIM card and/or housing. In some embodiments, the replacement SIM card and/or holster/tray can be coupled to other elements of the ESAP via a wired or wireless connection, including pogo pins, leads or other such connection mechanism allowing full or partial communication and functionality of a remote SIM (i.e. housed in software or in the ESAP and/or an associated device).

In some other embodiments, the ESAP can include slots/housings for the original SIM card and/or other, supplemental SIM cards. In some embodiments, the ESAP can allow the switching/selection/use as desired/configured of one or more different SIM cards based on hardware buttons, toggles, switches or other such mechanisms and/or via software features, capabilities and/or interactions. For example, in some embodiments, a user may want to take the SIM card from one carrier and put it in one holster/tray and the SIM card from another carrier in another holster/tray and select the use of one carrier while in certain locations (i.e. at work) and use the SIM card of a different carrier at different times/locations (i.e. perhaps because the signal of one carrier is better in a particular location or because it is for a different purpose such as personal/non-work calls and/or usage).

In some embodiments, the ESAP or associated devices can monitor/tap into the communication/interaction between the SIM card and the mobile device. In some embodiments, the monitoring can be used to allow monitoring, storing, processing, analysis and reporting on communications, interactions and/or connectivity or other information. In some embodiments, the ESAP and/or associated device can sit in between one or more SIM cards and the device to which the SIM is communicating and the ESAP and/or associated device can monitor, change, delete, add or even fully replace information to the communication stream. In some embodiments, the SIM functionality can be partially or entirely replaced with software, with some or all elements under the control, influence or direction of such software. For example, in some embodiments, a configurable or loadable list of identity numbers/information can be loaded or configured, allowing the user to select the identity number/information they desire to use at any point in time.

In some embodiments, some and/or all data stored, residing on, created by and/or transiting the SIM may be accessed, read and/or extracted, manipulated, added to, deleted, processed or changed. For example, in some embodiments of the invention, any or all text/SMS messages, contact info, location information, call logs, IMSI number, ICCID number and/or related information are examples of data that may be accessed, processed, changed, overwritten, added to or deleted.

Some embodiments include a hardware and software security stack (i.e. providing a hardware and/or software root of trust). In some embodiments, the ESAP, associated and/or protected devices can contain verified or otherwise secured and/or hardened chips to increase the trustworthiness of both the hardware itself as well as to allow for increased security of associated software. In some embodiments, the ESAP, associated and/or protected devices can enable verified, secure, dynamic or static (e.g. from non-modifiable memory or storage) software to be loaded/used, with such software residing local to the ESAP and the associated and/or protected devices and/or being accessed remotely or via external media (e.g. flash card, memory stick or other such external source, including via a wired or wireless network connection etc.).

In some further embodiments, the ESAP, associated and/or protected devices can provide secure or otherwise authenticated and verified features such as clock, geospatial positioning including verification and/or authentication against internal or external location sensors or calculations/comparisons using, (for example using independent or associated GPS sensors to verify reporting from other GPS systems, using information on known, calculated or assumed locations of other identified devices to compare against reported locations etc.) and other such system features and/or capabilities.

Some embodiments enable the ability for button presses or interaction with the ESAP and/or associated, including remote control systems, to result in actions/behaviors on associated devices. In some embodiments, when a button is pressed one or more times or one or more actions or series of actions is taken that is detected by the ESAP and/or one or more protected and/or associated devices, another set of actions, behaviors and/or capabilities can be enabled for a limited or enduring time period, where the action/behavior/capability and/or time period is preset and/or configurable by the user or by $3^{rd}$ parties. For example, in some embodiments, a user can configure a software application on a protected device to select another application and/or feature such as a camera application and/or social media application to launch and/or take other actions when a button is double-pressed (or otherwise actuated) on the ESAP. In this example, a user can cause the microphones to no longer be jammed (a capability of the ESAP or associated device) and the configured application to launch (a capability of the protected device). In this instance, actions such as taking pictures, using Snapchat® or other applications can be easier to perform/activate/enable, for example by reducing the number of steps that are normally required.

Some embodiments include providing one or two-way communication capabilities between the protected and/or associated devices and the ESAP and/or associated devices. In some embodiments, the ESAP and associated devices can communicate with the protected devices via any and/or all forms of wired and/or wireless communication (including radio frequency communications, optical and audio communications). In some embodiments, communication can occur by embedding signals in masking or other signals generated by the ESAP and/or associated devices, where the signals can be picked up and/or decoded by software running on the protected device. In some embodiments, communication can occur via haptic or other physical forms of communication, where signals can be detected by gyroscopes, accelerometers and/or other sensors capable of detecting physical signaling.

Some embodiments include providing a single or multiple sensor platform with the ability to aggregate, process (including change, add to and/or delete), analyze, report and/or act upon the detected and/or gathered information, including information gathered from sources other than that of the local or associated sensors.

In some embodiments, the ESAP can contain sensors such as for RF signals, environmental data and/or any other type of sensor. In some embodiments, the data and/or information detected and/or collected by some or all of these sensors can be stored, processed, analyzed, reported/communicated and/or acted upon either locally or communicated/shared for similar or other purposes with associated and/or protected devices, systems and/or remote, 3rd party or distributed or centralized collection points or systems.

In some embodiments, an RF sensor can provide for the detection of RF devices within the detection range of the sensor (e.g. cell towers/base stations, including roaming or rogue base stations, WiFi® or Bluetooth® devices, manned or unmanned aerial vehicles, cars, Internet of Things devices and/or any other device or entity that uses any form of RF communication).

In some embodiments, the information that can be gathered about the RF devices can be stored, processed (including being changed, added to and/or deleted), analyzed, reported and/or acted upon either locally or remotely. In some embodiments, some or all of the detected devices can be presented on a mapping application (e.g. Google Maps or Apple® Maps etc.). In some embodiments, the data gathered and/or presented on mapping and/or other applications and/or communicated/shared to other systems or users can be integrated or combined with other data sources, with such integrated or standalone data subsequently being added to, changed/modified or deleted. For example, in some embodiments, data sources including, but not limited to, other fixed or remote sensors, user entered data, internet data, data from other databases, data from security or IT systems or other collection, presentation and management systems, can be integrated with the data collected by and/or processed/created by the sensors.

In some embodiments, the user can see a map of known assets and/or perceived safe sources, potential risk zones or sources, and they can have overlays of other data provided by other systems that can be either standalone or aggregating data from multiple sources such that it could be shared with various users. For example, in some embodiments, a user can see a map of known WiFi® routers which are deemed to be "safe" and/or authorized, combined with the list of WiFi® routers that are actually detected by the sensor, such that the user and/or central systems would be able to compare the two and identify new, missing or rogue devices. In other embodiments of the invention, the user can be informed of other RF signatures detected by local or remote sensors, including, for example, if certain signatures, such as a drone or rogue cell tower are appearing in zones where they should not be detected. In some embodiments, uni-directional and/or bi-directional alerts and actions can be provided and/or taken based on the data being gathered, processed and/or shared by one or more sensors and/or outside data sources, including turning off the ability to communicate with perceived rogue or unsafe devices, logging or tracking movements or activity of these and/or other devices.

In some embodiments, information such as the signal strength of detected RF emitters, identity information or the communication system and/or protocol being used, can be detected by RF sensor and used to assess the nature of the RF emitter. For example, in some embodiments of the invention, the detection of what appears to be a base station with a location that appears to be changing, the appearance/presence of new, unknown, unidentified and/or unverified devices, the change in communication systems and/or protocols and/or the determination of the absolute or relative power levels of RF transmitters can be used alone and/or in combination with each other or with other techniques to indicate/determine/rate the trustworthiness of such RF transmitters. In some embodiments, the use of these and/or of other data points and/or indicators can be used to trigger alerts, tracing, monitoring and/or prevention of communication to/from systems that cross a threshold of risk.

In some embodiments, some or all of the data collected by one or more sensors can be stored in local databases and/or aggregated into one or more levels of central and/or distributed databases. In some embodiments, these databases can create a log and/or history of the data collected by these and/or other sensors, such that the data can be stored, processed, analyzed and/or combined with other information. For example, in some embodiments, if a drone or other device (rogue or otherwise) is detected by a sensor, then reviewing and/or further processing of such databases can allow, for example, historical tracking of the movements of such devices, and/or a determination of when the device was originally detected, and/or if the signature of the device can be matched with other instances where the device may have been identified, including matching with associated devices and/or other such patterns.

In some embodiments, the data collected by one or more sensors and/or inspection/capture capabilities can allow for retroactive analysis and/or determination of previously hidden and/or unidentified issue or threats. For example, in some embodiments, capturing the IP header information and/or application usage information can be used after a malware command and control server has been identified. In this instance, historical logs can be reviewed to determine which devices were communicating to such systems in the past and/or, for filters and/or alerts to be established if devices attempt to communicate to such systems in the future.

In another example embodiment, a hit and run driver can be detected by identifying the unique or narrowing RF or other such signature of the offending vehicle, with some embodiments of the invention capturing the presence of the vehicle via the RF signature at the point in time of the incident. In some embodiments, the data collected/detected by RF and/or other sensors can be used to calculate the location and/or the movements of RF emitters and/or other detectable devices using triangulation and other such techniques.

In some embodiments of the invention, RF and/or other sensors can be used as an RF or other type of surveying tool, to detect and/or map devices in time and/or space. In some embodiments, the baselines created by such measurements at any point in time can be used to detect changes or anomalies in the environment. For example, in some embodiments, an air quality sensor can establish a baseline against which changes in air quality are measured, triggering actions such as alerts and/or updates, while in other embodiments, a health sensor can establish normal ranges and alert when these ranges are exceeded. In further embodiments of the invention, the combination of data from multiple sensors can be used to calculate and detect correlations across detected/captured data sets. For example, in some embodiments, the invention can allow for identifying the correlation of changes in things such as air quality, altitude, humidity, movement, location or other such measurable data and health data (e.g. heart rate etc.) collected by wearable or fixed devices.

In some embodiments of the invention, some or all data collected by one or more ESAPs (e.g., from one or more users) can be aggregated into one or more distributed systems. In some embodiments, the data collected can be combined or supplemented with data collected from other sources, including non-ESAP sensors (e.g. fixed or mobile sensors, sensors in phones, tablets or other devices etc.) public or private data sources or information etc. In some embodiments, some or all of the combined data can be processed (e.g., changed, added to and/or deleted), and analyzed, reported and/or acted upon either locally or remotely. In some embodiments, some or all of the information can be shared or distributed between and amongst one, more or all remote ESAP's or other devices and/or systems.

In some embodiments, the combination of data collected, gathered, purchased or otherwise acquired can be used to develop new or derivative data that can be mapped, shared, sold or otherwise utilized. For example, in some embodiments, the data collected by multiple RF sensors can allow for the locations of RF devices to be tracked, mapped and shared for points in time or in real time. In some embodiments, specific geographic or multiple geographic areas (i.e. map some or all of the regular and/or rogue cell towers in a city or area at a certain point in time or in real time, track and/or map some or all detected drone movements in an area etc.) can be assessed. In some embodiments, alerts, decisions and actions can be taken or communicated by the ESAP or associated or protected devices or by remote and other systems based on the data and and/or results of analysis and processing. For example, in some embodiments, if a possible rogue cell tower is detected, then one or more series of actions can be initiated resulting in the disabling of the cell communications of protected devices in the area. Further, in another embodiment, if a new WiFi® router is detected in a bounded area in which such a device is decided to not be allowed (e.g. a corporate campus etc.), then an alert and the location and identity information of such device can be provided.

In some embodiments, an RF sensor can be used to trigger an action or behavior. For example, in some embodiments, in order to serve a purpose such as conserving power, the activation of a system to collect or monitor data receipt/transmission to/from a device can be triggered only upon the detection of RF energy indicating that such a receipt/transmission is likely to occur or is occurring. For example, in some embodiments, an RF sensor can detect when a mobile device is transmitting to a cell tower, WiFi® router, Bluetooth® device or other device/system by determining that the transmitting power level (or received power level) of RF systems on or to the device has surged to a threshold at or above which transmission is likely to occur.

In some embodiments of the invention, once activated, the gathering or other such capability that has been activated can stay enabled for a fixed period of time, a varying period of time and/or for a period of time that is tied to ongoing other events. For example, in some embodiments, the gathering and/or analysis of RF signals can occur while transmissions or actively being detected. In others, for example, if the transmissions are non-continuous in nature, then the collection can occur after the trigger and continue for a fixed or configurable tail after transmissions are no longer being detected. In this instance, the tail serves a purpose such as preventing the switching on/off of the collection system during periods of periodic or burst-like transmission.

Figure 5:
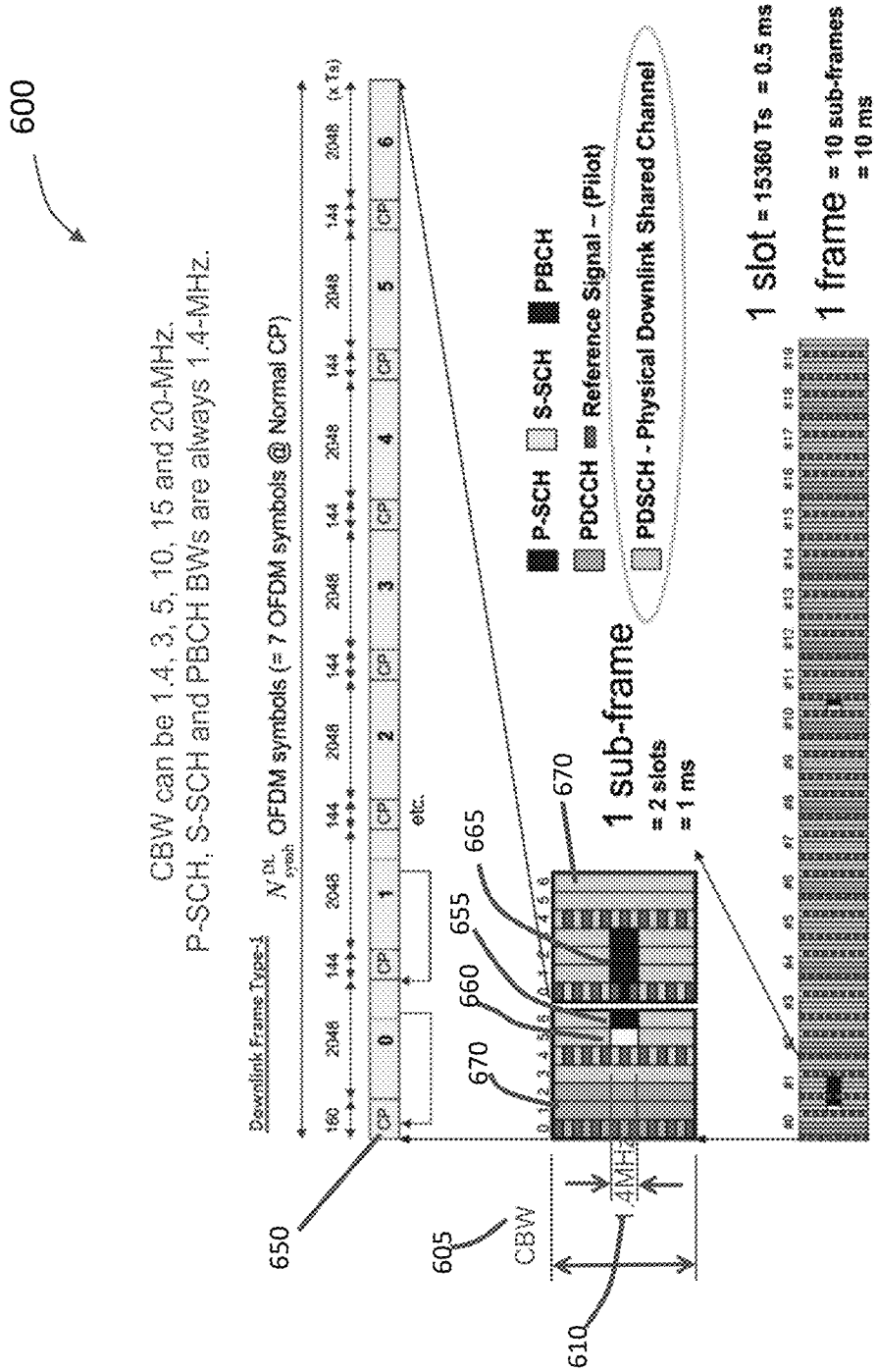
FIG. 5 illustrates the LTE frame structure and depicts the limited CBW that can be used to access certain information in accordance with some embodiments of the invention.

In some embodiments, in order to reduce the amount of collected data and/or to speed analysis or to perform some other such function, only a fixed or varying percentage of transmissions/traffic can be collected and/or monitored. For example, in some embodiments, 50% of transmitted packets can be collected, where more than one packet is needed to establish and pass meaningful information. As an example, if the goal is to capture the source/destination IP address of all meaningful communicators, capturing a reduced percent can provide the desired insight/information while reducing power or collection requirements, with such percentage varying for different purposes, at different times and based on the capabilities and resources of different systems/platforms. In other embodiments, a limited amount of bandwidth can be captured and/or processed by an RF sensor/system to serve the purposes of reducing the amount of data being collected and/or analyzed, to reduce power consumption, and/or to reduce the capabilities, cost and/or development time required of underlying systems. For example, as depicted in FIG. 5, in some embodiments, 1.4 MHz (marked as 610) of an overall larger channel bandwidth 605 can be captured and analyzed, providing the desired information, but reducing many other requirements of the system. In some embodiments, a transmission using orthogonal frequency-division multiplexing can include cyclic prefix ("CP") (650), primary synchronization channel ("P-SCH") (655), secondary synchronization channel ("S-SCH") (660), physical broadcast channel ("PBCH") (665), and/or physical downlink control channel ("PDCCH") (670). In some embodiments, the PDSCH (665) can be used to transfer information such as application data, allowing targeting for specific purposes (e.g. source IP address of incoming packets etc.). In some embodiments, the section of the LTE frame containing application data can be identified and targeted such that only the meta-data associated with underlying data can be captured. For example, in some embodiments, only the portion of the LTE frame containing IP header information such as the source and destination IP address may be desired and so the section of the LTE transmission containing such information can be targeted, reducing the need to capture extraneous information.

Figure 6:
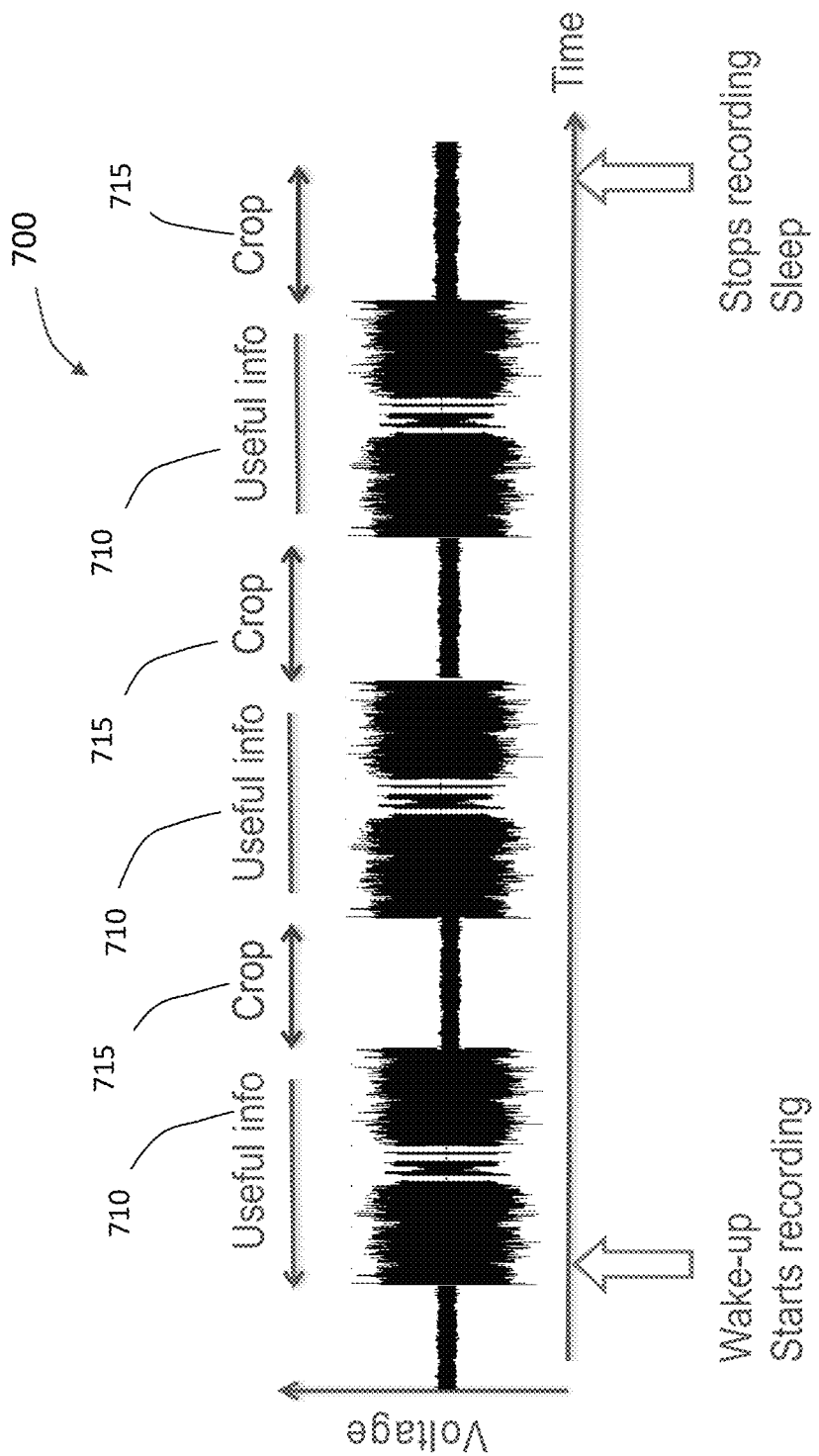
FIG. 6 illustrates a recorded frequency with cropped regions in accordance with some embodiments of the invention.
Figure 7:
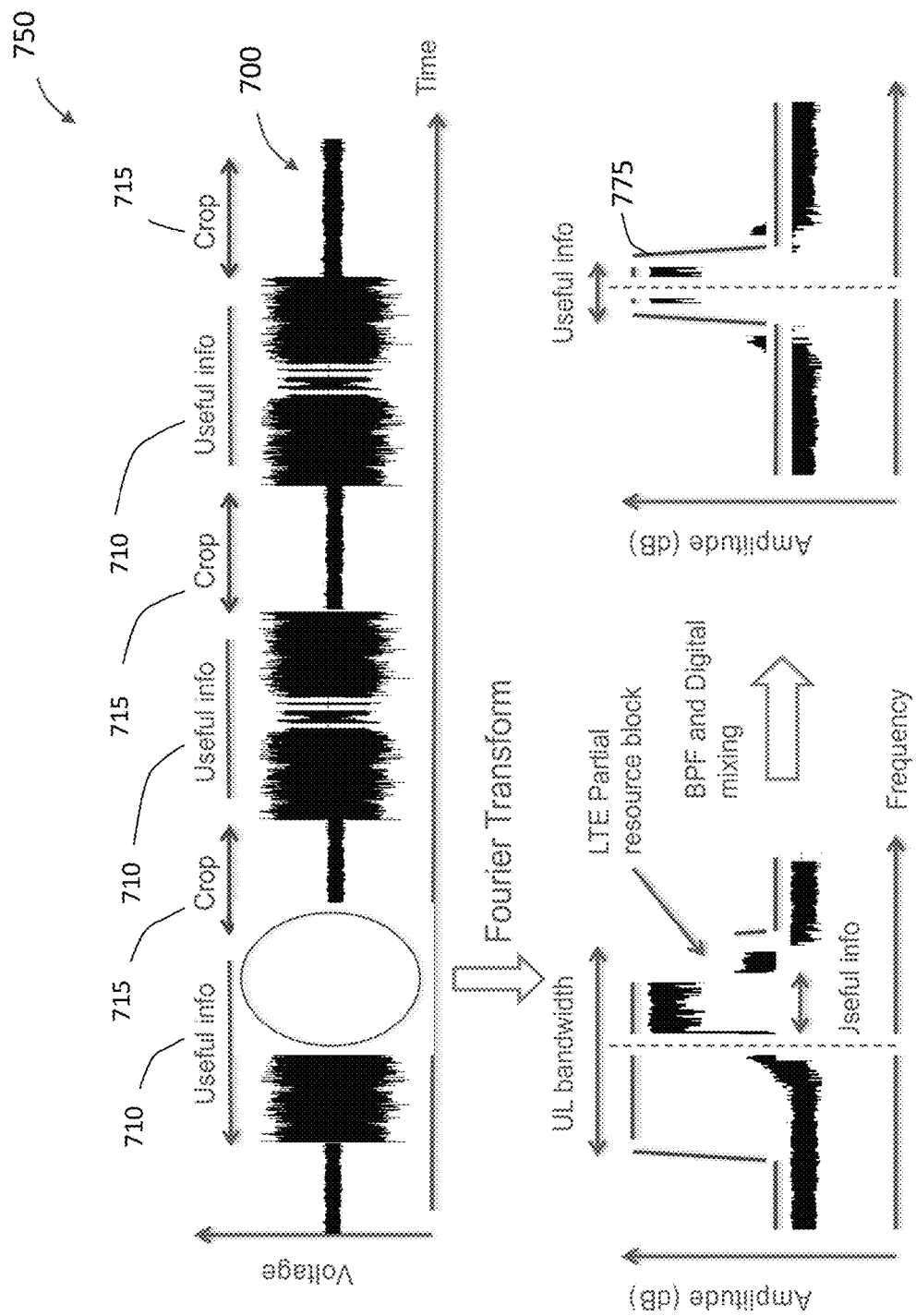
FIG. 7 illustrates a Fourier Transform process of the recorded frequency of FIG. 6 in accordance with some embodiments of the invention.

In other embodiments, as depicted in FIGS. 6-7, time domain, frequency domain and/or other filtering techniques can be used to reduce the amount of information being gathered and/or analyzed, cutting out signals with little or no information or with non-useful information for the desired purpose. For example, FIG. 6 illustrates a recorded frequency with cropped regions in accordance with some embodiments of the invention, and FIG. 7 illustrates a Fourier Transform process 750 of the recorded frequency of FIG. 6 in accordance with some embodiments of the invention. In some embodiments, frequency recording 700 can include periods 710 of useful information separated from cropped regions 715. As depicted in FIG. 7, in some embodiments, the periods 710 can be processed with Fourier Transform and digital mixing to extract a frequency portion 775.

In some embodiments of the invention, processing of collected data can be performed locally, while in other embodiments, it can be performed remotely and/or in some combination of one or more locations/systems. For example, in some embodiments, the power and resources to collect data can reside local to the transmitting/receiving device, but the processing, analysis and/or presentation of the collected data can occur remotely. This can be done for the purposes of conserving power, reducing the requirements of the local system, for security and/or speed, for data aggregation, assessment and/or other such purposes to name a few. In some embodiments of the invention, any processing or analysis that is done remotely can have some or all of the results shared with one or more gathering devices and/or to other devices, systems and users.

In some embodiments, the ESAP can provide other functions, capabilities and/or enhancements. For example, in some embodiments, the ESAP can include sensors including, without limitation, step and activity counters/monitors, health monitors, thermometers, pollution sensors, chemical/hazard sensors, sensors capable of sensing in 3D, environmental and/or any other type of sensor/monitor. In some further embodiments, camera components such as lenses, etc., can be included. In some other embodiments, audio speakers or other audio enhancements can be included. In some embodiments, antennas and RF or other forms of wireless communication enhancers or functionality can be included. In some embodiments, projectors (e.g., that can be configured to project the screen of a protected/enclosed device) can be included. Some further embodiments include credit card and other storage (for example, passports can easily fit in an ESAP for a tablet), including products with RF protection. Some further embodiments include credit card swipe technology, and all other types of conventional electronic payment systems technology. Other embodiments can include data/memory stick storage, both accessible and inaccessible by protected devices and/or other add-ons or the ESAP itself. Some further embodiments include extra/supplemental battery packs or other energy sources (e.g., solar power, and/or activity/kinetic/motion based power generators).

Some embodiments include at least one expansion pack slots for additional add-ons. For example, Taser® devices, mace and/or other self-defense related items. Taser® is a registered trademark of TASER International, Scottsdale, Ariz. Some further embodiments include health monitoring and/or intervention devices (e.g. blood glucose monitoring, motion, gait and walking data, disease progression and/or intervention, blood pressure, heart rate and any other type of health data etc.)

Some embodiments of the ESAP can also include audio masking systems to protect against audio beacons (high and/or low frequency and/or combinations) and/or any other type of audio signal (audible or inaudible) by providing specific frequency components to the ESAP's masking signal to interfere with, change, degrade, mask or prevent the ability of protected device microphones to receive or accurately interpret audio signals. Similarly, some embodiments include light and/or RF masking systems to interfere with, change, degrade, mask or prevent the ability of protected device cameras and RF receivers to receive or accurately interpret optical and/or RF signals.

Some embodiments of the ESAP can include detents, buttons, catches and/or releases to help secure and release a cover of the ESAP to a case. Some other embodiments of the ESAP can also include retention mechanisms such as one or more bumps or other suitable devices to help hold/retain protected devices. Some further embodiments of the ESAP can accommodate an Apple® iPhone® 6 and 6s (or one or more conventional devices from other manufacturers) in the same case, including additional audio maskers and other protective features tailored to support such one or more enclosed devices. Apple® and iPhone® are registered trademarks of Apple Inc. of Cupertino, Calif.

Figure 4:
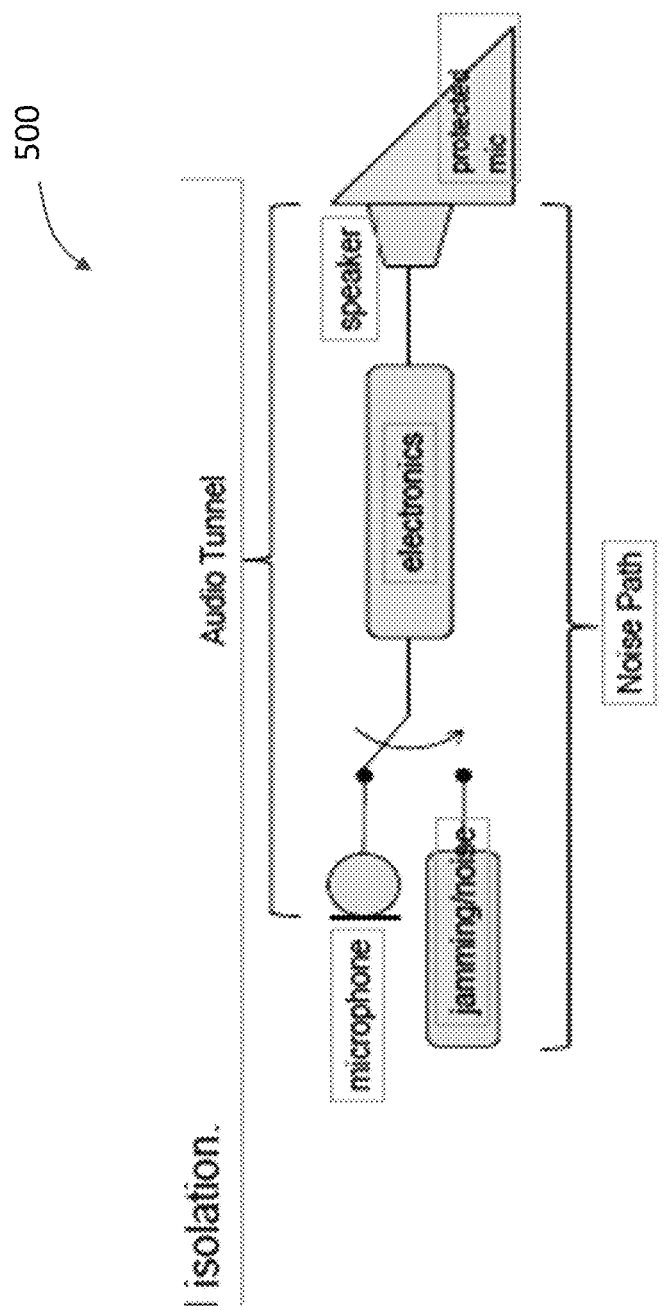
FIG. 4 illustrates an ESAP audio protection circuit in accordance with some embodiments of the invention.

In reference to FIG. 4 showing circuit 500, one or more microphones can be added to the ESAP such that audio from the area around the protected, enclosed or associated device can be detected by the microphone. In some embodiments, there can be a one-to-one mapping between microphones added to the ESAP and those associated with a protected device, while in other embodiments there can be a one to many/multiple or many/multiple to one relationship. In some embodiments, the output of one or more of the microphones contained or associated with the ESAP (including remote microphones that can be connected via a wired or wireless connection (e.g. Bluetooth®, Bluetooth® LE, WiFi®, infrared, NFC etc.)) can be passed to one or more microphones within the protected or associated device, while in other embodiments, the output can be disconnected and/or passed to other devices and/or systems.

In some embodiments, the systems can include one or more digital signal processors (DSPs), microprocessors, analog and/or digital components/systems. In some embodiments, the systems to which microphone output can be directed can include the ability to process, analyze, store, record, change, modify, add or delete content detected and passed on by an associated microphone. In some embodiments, the systems can modify the audio signal, with the result that the audio signal can become harder to detect, process, identify, or analyze by listeners and/or other systems (i.e. voice recognition and/or identity/voiceprint systems etc.). Further, in some embodiments, the audio signal can sound more like and/or closely like or substantially identical to another person's voice pattern. Further, in some embodiments, the audio signal can sound like a novelty signal (e.g. such as a voice affected by inhaled helium), and in any or all above described capabilities, the tuning and adjustments and/or mixing of such capabilities or features are selectable and/or configurable by the user of the ESAP and/or by third parties or other systems.

In some embodiments, other signals can be mixed in with the audio signal, including adding such signals such as wind noise, traffic sounds, music or other voices to name a few. In some embodiments, rather than passing the detected audio signal (modified or unmodified) to any associated microphone, an entirely different signal can be played/passed on to any associated microphone. In some embodiments, this signal can be a masking or jamming signal that impedes, blocks, obstructs, obfuscates, overwhelms, saturates, diminishes or otherwise impacts the ability of the associated microphone to detect other audio signals. Further, the masking or jamming signal can diminish, impact, impede or even prevent anyone listening in or recording such content to understand, decipher or otherwise extract meaning from the signal, including for example, voice conversations in the area of such microphones.

In some embodiments, one or more of the microphones associated with the ESAP can detect one or more words and/or phrases, sounds and/or signals in order to trigger certain capabilities, actions and/or behaviors. In some embodiments, these capabilities, actions and/or behaviors can include passing through and/or blocking, filtering or otherwise modifying detected audio signals or enabling accessibility or operation of cameras, antennas and/or other sensors or communication capabilities. In some embodiments, some or all of the words and/or phrases, sounds and/or signals can be restricted such that only one or more authorized individuals and/or systems or devices can be allowed to trigger capabilities, actions and/or behaviors (e.g. husband and wife, but not children etc.), while other embodiments include no restrictions. In some embodiments, one or more combination of signals and/or other factors can be required to enable certain capabilities, actions and or behaviors (e.g. during work hours or in certain geographical locations, and for example in a secure facility where microphone and camera recording is generally restricted). For example, in some embodiments, the detection of a beacon is required along with a voice passphrase in order to enable the jamming signal to be turned off and access to protected microphones and/or cameras to be enabled.

In some embodiments, any words and/or phrases, sounds and/or signals triggering or enabling certain capabilities, actions and/or behaviors of the ESAP can be either pre-set and/or configurable/selectable by the user or by third parties. For example, in some embodiments, if a user does not want a digital assistant running on a protected device to be listening within a house or other area, the user can enable jamming on the ESAP. In some embodiments, the jammed can be configured so that when a certain phrase is spoken by the individual (or other authorized individual), the jamming can be turned off. In this instance, ambient audio detected by one or more microphones associated with the ESAP can be passed on to one or more microphones on the device associated with or protected by the ESAP so that user words, phrases and/or instructions it can be heard and acted upon by the digital assistant.

In some embodiments, one or more of the signals that the digital signal processor or other systems on or associated with the ESAP can play or pass-through to one or more microphones on the associated or protected device can be configured to impede, mask, obstruct, spoof, confuse or otherwise change or impact high-frequency signals/beacons emitted by one or more devices. For example, in some embodiments, the high-frequency signals/beacons can be frequencies above those normally associated with normal human voice or easy hearing, and can be emitted from devices such as televisions, radios, computers, tablets, beacons or other electronic devices.

In some embodiments, the power level of signals played or passed through the digital signal processors or other systems on or associated with the ESAP can be modified based on the ambient sound level detected by one or more microphones on or associated with the ESAP. For example, in some embodiments, if a person speaking near the ESAP is detected to be raising the level of his/her voice, up to and including shouting, or if the general ambient noise level is increasing or decreasing, then the masking or other signal played or passed by the systems on the ESAP can be increased or decreased, and a louder or softer signal can be played or passed.

In this instance, similar or greater levels of protection can be provided (for varying levels of audio signals being protected) to one or more microphones on a device protected by or associated with the ESAP, resulting in an adaptive (i.e., either up or down) level of protection. In some embodiments, the provision of adaptive masking or protective signal capabilities can provide higher levels of protection for louder voices, environments, and/or signals, and/or an improved matching of sound levels and/or power consumption when compared to a non-adaptive systems. Further, in some embodiments, this adaptive masking capability can provide increased protection without materially increasing the obtrusiveness of the masking or other such signals which might otherwise be distinguishable in quieter environments if the signals were permanently set to protect against higher power/level audio signals.

In some embodiments, the seed and/or the jamming, masking or other signal created or used by the ESAP or associated device can be generated within the digital signal processor, FPGA, microprocessor, and/or by the firmware/software of these devices (e.g. through the use of pseudo random number generators and/or algorithms such as AES encryption with various key lengths etc.). In other embodiments, the seed/signal can be generated by external or dedicated other electronic components. In some embodiments, the seeds or signals can be generated by measuring and/or sampling the noise created by applying power to an electronic component such as a resistor, and/or by a Zener diode in breakdown mode, etc.

In some embodiments one seed or signal can be used to generate multiple other signals, by either reusing the same seed or by sampling such seed at pre-determined or randomized intervals. In other embodiments, multiple seeds/signals will be used, with each separate seed/signals being used to generate one or more corresponding jamming/masking signals. For example, in some embodiments, a true or near true random noise seed/signal can be generated, after which the seed will be sampled at interval x, y and z (up until n or more seeds/signals are generated from one or more seeds). In some embodiments, seeds can be created at predetermined and/or variable or random times. For example, in some embodiments, a random or pseudo random seed can be sampled to determine how frequently to generate or change one or more keys used to generate one or more signals. In some embodiments, this can increase the difficulty for an attacker to identify and/or determine the one or more seeds, and/or increase the difficulty for an attacker to know when or for how long such seeds can have been in use. Further, this can increase the difficulty for an attacker to make it more difficult to decipher, decrypt, understand and/or increase the difficulty for an attacker otherwise extract the content of anything protected by such pool of seeds and resultant child seeds/signals.

Some embodiments of the ESAP can also include a lit bezel or other portions of the housing that are lit. Some embodiments of the ESAP can also include ability to start and/or stop wireless RF charging. Some further embodiments of the ESAP can also include stop location tracking from battery usage (based on emission variations from connections to cell towers). Some embodiments of the ESAP can also include use of a smartphone as a token in a multi-factor authentication system. Some embodiments of the ESAP can also include use of the activation/deactivation of audio, and/or video, and/or RF or other form of protection/service/feature as a password or authentication capability to verify protection or other such functionality.

Some embodiments of the invention include registering the ESAP with an IT or phone system such as a corporate/enterprise IP phone system manager or IT management/monitoring/control system. In some embodiments, the ESAP can then download the phone numbers or device information supported by the system. When a call or other service or interaction (i.e. data communication or transfer) is made from the phone or other device protected and/or associated with the ESAP to a device connected or authorized by the corporate/enterprise phone/management/monitoring/control system, the ESAP can instruct hardware and/or software on the mobile phone or protected/associated device to encrypt the call and/or route it to a centralized or decentralized endpoint on the internal or external voice or data network where it can be decrypted and picked up or passed on to the appropriate user. In some embodiments, the call can be routed to a protected and/or associated device if it possesses the needed capabilities.

Some other embodiments build an encrypted calling capability on top of a proprietary or open source system (such as Signal®, by Open Whisper Systems). In some embodiments, when the application on the phone calls a number, it can initially check with the ESAP to see if that number is on the corporate phone system and is eligible for secure and/or encrypted communication. It the number is eligible, the ESAP can instructs the application where to direct the call so the call can be securely completed.

Accordingly and additionally, some embodiments of the invention provide a platform to enhance phones and other protected/associated devices. Some embodiments combine compelling functionality (i.e. privacy/security, drop and environmental protection) and a platform for other functions to be added. Accordingly, third party developers can simply plug/interface their developments into the platform and leverage the power, communication and other platform offerings/features/capabilities. Some of these embodiments can enable one-time or usage-based charges for access to platform functionality, including monitoring and electronic commerce functionality and interfaces for doing so.

Some embodiments include a beacon based policy, security and management system. In some embodiments, the ESAP can couple to a system that can define policies to manage devices based on geographic or other contextual based criteria. For example, a Board of Directors may want all phones in the room to have their microphones disabled while discussing M&A strategy, a government base or facility may only want to allow access to certain applications from secure facilities etc. For example, some embodiments include a beacon-based system to communicate with and guide and/or set policy with associated devices. In some embodiments, users will be able to use these beacons to communicate with devices and set policies, rules and actions based on certain criteria for the devices within range of the beacon or system of beacons. As used herein, the term "beacon" can refer to one or more beacons or similar devices.

In some embodiments of the invention, one or more beacons can be used to send a signal that can be detected by the ESAP, phone, tablet or other device, where the signal can indicate that certain activities and/or actions should be taken. In some embodiments, the signal emitted by the beacon can be an audio signal, a light signal and/or an RF signal, or some combination of such signals. In some embodiments, the signal can be configured such that it has specific power levels or it encodes information that can be used by a receiver to better determine the type of action/activity to be taken (or not taken).

Some embodiments include a two-way communication between the beacon and one or more devices with which it is interacting, including, but not limited to, downstream devices acting upon signals emitted by the beacon, and upstream devices providing direction to or through the beacon.

In some embodiments, there can be an identity and authorization mechanism incorporated to limit the devices that can communicate, decode or otherwise interact with the beacon. In some embodiments, the beacon can work in conjunction with other beacons such that coordinated policy or actions (including differentiated ones) can be implemented across networks of beacons. In some embodiments, the beacon can indicate to an ESAP, phone, tablet, computer or other device that microphones should be disabled, cameras should be disabled or covered, RF communications should be disabled or covered and/or only certain type of RF communications and/or access to certain systems, hardware or software should be enabled.

In some embodiments the rules, actions and/or instructions provided by a beacon can last beyond the period of time during which a device can be in range with or can communicate with a beacon. In some embodiments the beacon will provide a trigger for the associated device to share or provide data and information to the beacons and or upstream or downstream devices. In some embodiments, the listening mechanism for beacon transmissions can be via sensors in phones, tablets, ESAP or other devices and the actions can be initiated by software running on the devices. In some embodiments, one or more beacons can transmit intermittently or at pre-determined or random times, while in other embodiments the beacons can transmit continuously. In some embodiments, the beacons can overlap in there transmission areas for reasons such as more complete coverage, redundancy and/or for other reasons, including based on physical limits and/or constraints for placement, power availability etc. In some embodiments, beacons can be powered via plug-in power, while in others beacons can be powered via batteries, solar cells, heat or motion based systems and/or other types of power approaches or a combination of such approaches.

Some embodiments of the invention can enable a protected device to remain protected but useable in a secure facility. In some embodiments of the invention, an enclosure with an RF shielding capability can be provided. In some embodiments, the enclosure can include one or more data connectors (e.g. Lightning® from Apple®, USB-C, micro-USB etc.) on the exterior of the enclosure. In some embodiments, the connectors can be connected via one or more pass-through filters passing one or more specific frequencies used by each connector while not materially reducing the RF attenuation of the other frequencies protected by the enclosure. In some embodiments of the invention, this can allow a mobile phone, a tablet or other device to be placed in the enclosure, and connected to a corresponding data connector on the inside of the enclosure. Further, a keyboard and/or monitor or other peripheral device can be attached so that the data, processing power, and a screen, and/or other function can be visible and/or accessible from outside the enclosure while RF protection is provided by the enclosure. Further, in some embodiments, the enclosure can include one or more audio jammers that play inside the enclosure when activated (or by default when power is available), so that any recordings made by microphones associated with devices in the enclosure are degraded, confused, jammed, saturated, obfuscated, impeded, reduced or otherwise impaired. In this instance, there can be a reduction or disabling of the ability to extract meaningful content, human voice or other content from the recordings. In some embodiments, the shape, materials and/or other characteristics, materials or makeup of the enclosure can be tailored to reduce the sound reaching microphones within the enclosure.

Some embodiments include a standalone audio jammer and/or camera blocker. In some embodiments, the audio jammer and/or camera blocker can be used to make secure any consumer device that can include a microphone or imager, including, but not limited to, appliances, thermostats, light bulbs, cars, televisions, remote controls, special purpose devices such as personal digital assistants (e.g., Amazon Echo®, Google Home®). In some embodiments of the invention, one or more standalone audio jammers and/or camera blockers can be grouped into one or more sets, such that the activation/deactivation of one results in the activation/deactivation of others in the set or in one or more sets. In some embodiments of the invention, the standalone audio jammer and/or camera blocker can include an internal fixed or replaceable power source, (e.g. a coin cell or other form of battery). In some embodiments of the invention, the standalone audio jammer and/or camera blocker can will be packaged with one or more fixed or removable attachment mechanisms, including, but not limited to, a sticker, suction, adhesive, Velcro®, hooks, glue and/or any of numerous other such methods.

In some embodiments, the standalone audio jammer and/or camera blocker can be attached to any device with a microphone or camera, providing protection when activated and passing through audio/video when deactivated. In some embodiments of the invention, wireless communication capabilities can be provided (e.g. WiFi, Bluetooth®, Bluetooth® LE, NFC, infrared, radio wave, cellular etc.), such that the activation/deactivation of protection can occur by a remote device (e.g. a dedicated remote control, a mobile phone, a programmable remote, a laptop, computer or tablet etc.)

In some embodiments of the invention, a code word, noise, signal, phrase or other such means of communication can be used to activate or deactivate protection. For example, in some embodiments, a phrase matching that of the underlying device can be programmed or selected, such that saying or using the phrase or signal not only activates or deactivates the protection, but also can activate or deactivate the underlying device, where different words or phrases or signals can be used for activation or deactivation.

In some embodiments of the invention, an LED and/or some other form of audio, video, wireless (e.g. such as a RF, WiFi®, BT, BT LE, NFC, cellular, infrared signal) can be used to indicate battery status, activation or deactivation of protection, such that it is audible or visible to those within range or it can be detected by mobile devices, applications or other associated devices or systems, local and/or remote.

Some embodiments include a distributed sensor platform and service (thereby providing a software as a service (SAAS) based services to customers). Some embodiments include providing a single or multiple sensor platform with the ability to aggregate, process (including change, add to and/or delete), analyze, report and/or act upon the detected and/or gathered information, including information gathered from sources other than that of the local or associated sensors. In some embodiments, a protection device can contain sensors (or a dedicated sensor) for RF signals, environmental data, or any other sensing data. The data and/or information detected and/or collected by some or all of these sensors can be stored, processed, analyzed, reported and/or acted upon either locally or communicated or shared with associated and/or protected devices, systems and/or remote, $3^{rd}$ parties or distributed or to centralized collection points or systems for similar or other purposes.

Some embodiments include a system for electronic device security/privacy, including mobile phones, tablets, computers, internet of things devices and any other device containing sensors. Some embodiments can control when the devices are able to record sensitive moments and/or conversations, transmit and/or receive RF signals or other forms of communication, maintain control over geo-location tracking capability, including when the device can be used to determine and/or pass location, movement and/or other types of information. Some embodiments include a system to disable and/or disconnect, power down or otherwise prevent the use of the sensors, antennas or other collection and/or communication capabilities.

Some embodiments include a physical cutoff switch or ability to interrupt, disable, disconnect, interfere with, scramble/obfuscate, modify or otherwise impact and/or impede the ability or the path for power, collection and/or communication to or from or by any sensor, antenna or the system of electronics, components and/or pathways configured to detect, collect, store and/or communicate, transfer, or transmit information. In some embodiments, such a switch can be within a chip or within any chip within the chain or system of chips and/or hardware that allows the sensor, antenna or other device to be connected or to communicate.

Figure 8:
FIG. 8 illustrates a proximity sensor accessory in accordance with some embodiments of the invention.

Some embodiments of the invention include ESAP devices, components, assemblies, and/or systems that provide an adaptive function, response, or capability. For example, some embodiments include adaptive devices that determine what the user is doing to control active features of a device. For example, some embodiments include a physical motion or gesture sensor and control assembly. In some embodiments, the ESAP can utilize physical motion or gesture sensor and control assemblies present in a protected device such as a smart phone. For example, FIG. 8 illustrates a proximity sensor 805 accessory in accordance with some embodiments of the invention. In some embodiments, the proximity sensor 805 can be enabled to turn on the microphones of a user's device 801 when close to a user's face. In some further embodiments, a liquid mercury switching alternate sensor can be used to determine intent.

In some embodiments, a user can select the type of sensors that are available (e.g., such as those selectable or configurable in Google Ara™ software and mobile device).

Figure 9:
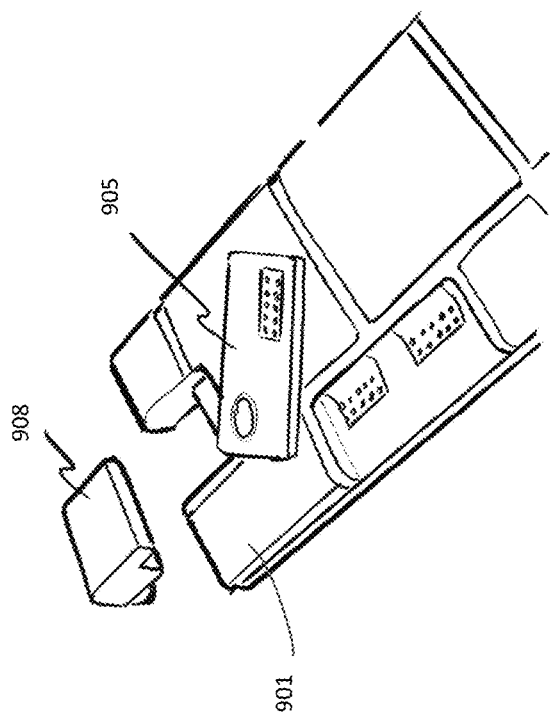
FIG. 9 illustrates a modular phone in accordance with some embodiments of the invention.
Figure 14:
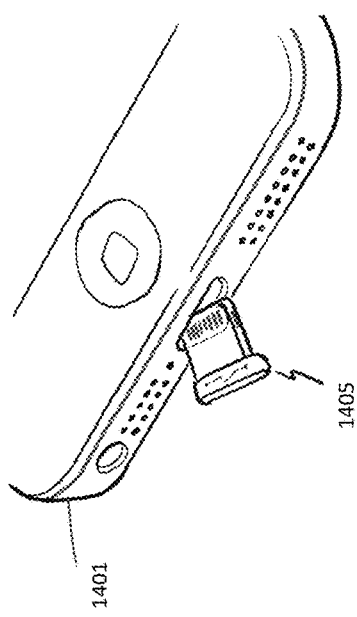
FIG. 14 illustrates a deactivate key in use with a device in accordance with some embodiments of the invention.

For example, some embodiments include microphone and camera modules that can be selected to enable phones to be ordered for a particular purpose. Some embodiments include on-the-fly configurations by users, such as an SLR camera, flash module, and lenses. Some embodiments include a modular phone with on-demand removal of unwanted sensors. For example, FIG. 9 illustrates a modular phone 901 in accordance with some embodiments of the invention. In some embodiments, the modular phone 901 can include a camera and/or microphone module 905 and/or removable sensors 908 (FIG. 14).

Figure 10:
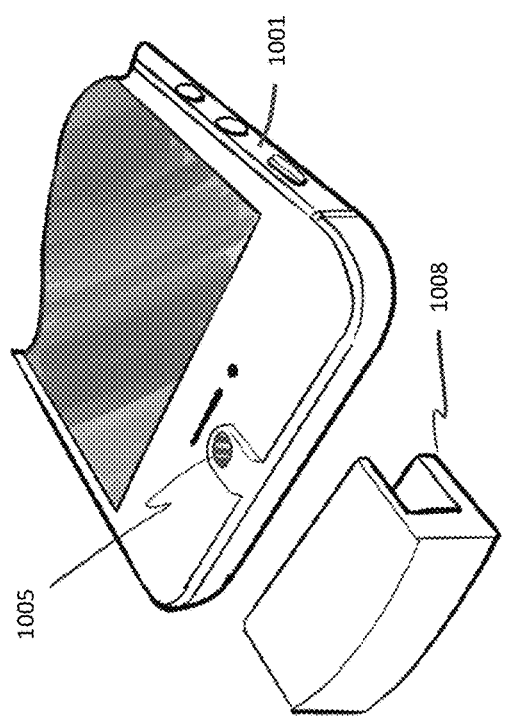
FIG. 10 illustrates an LCD shield in accordance with some embodiments of the invention.

Some embodiments include an electric shield. For example, in some embodiments, for a camera (e.g., in a phone, laptop or desktop computer), a low profile electronic shutter can be effective. In some further embodiments, microphones can be shielded electrically at the PCB level. Some embodiments include a polarized lens window or selectively opaque window to block video or imaging. For example, FIG. 10 illustrates an LCD shield 1005 on a user device 1001 in accordance with some embodiments of the invention. Other embodiments include a cover 1008 to cover sensors.

Figure 11:
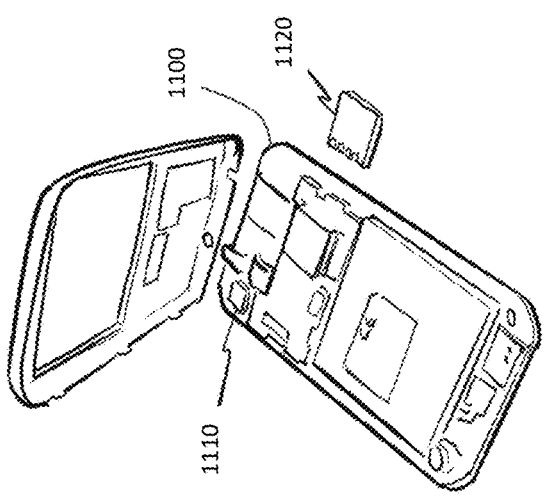
FIG. 11 illustrates encryption and dongle key systems in accordance with some embodiments of the invention.

Some embodiments enable encryption of the data between devices/systems/components inside a device. For example, some embodiments include encryption of audio and/or video or imaging data in a phone. Some embodiments can utilize sensors and controlled keys. For example, FIG. 11 illustrates a user device 1101 with encryption and dongle key systems in accordance with some embodiments of the invention. For example, some embodiments utilize software encrypted keys 1110 integrated with the device 1101 and/or one or more physical dongle key 1120 copy security keys. Some further embodiments include one or more high security SIM cards (including lockable SIM cards) with audio protected functions.

Figure 12:
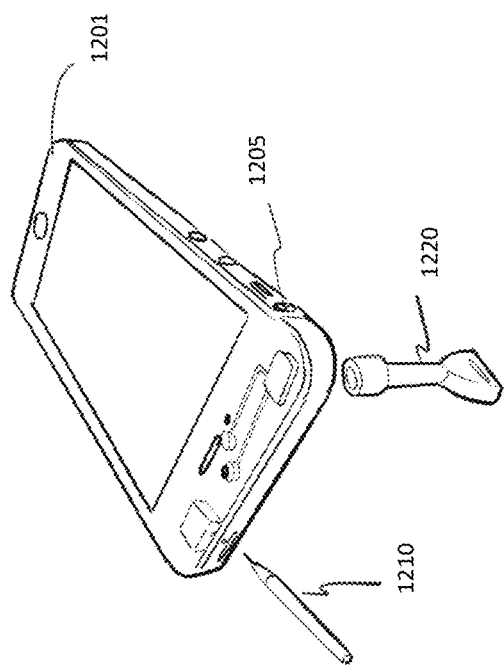
FIG. 12 illustrates ESAP switches and tools in use with a protected device in accordance with some embodiments of the invention.

Some embodiments include protection with one or more mechanical switches. For example, some embodiments include magnetic switches that can preserve the ID of the protected device, and can be switched with the correct kind of cover or key. Further, other embodiments include hard mechanical switches. FIG. 12 illustrates ESAP switches and tools in use with a protected device 1200 in accordance with some embodiments of the invention. For example, some embodiments include one or more hard switches such as mechanical power switch 1205 to enable control of audio and/or video or imaging of the device. Some further embodiments include a stylus deactivation tool 1210 that can be used as a stylus or key to insert and disable sensors. Some other embodiments include an internal reed switch for use as an external magnet 1220 to switch between modes. Other embodiments include magnetic switches and/or embedded magnetic switches.

Figure 13:
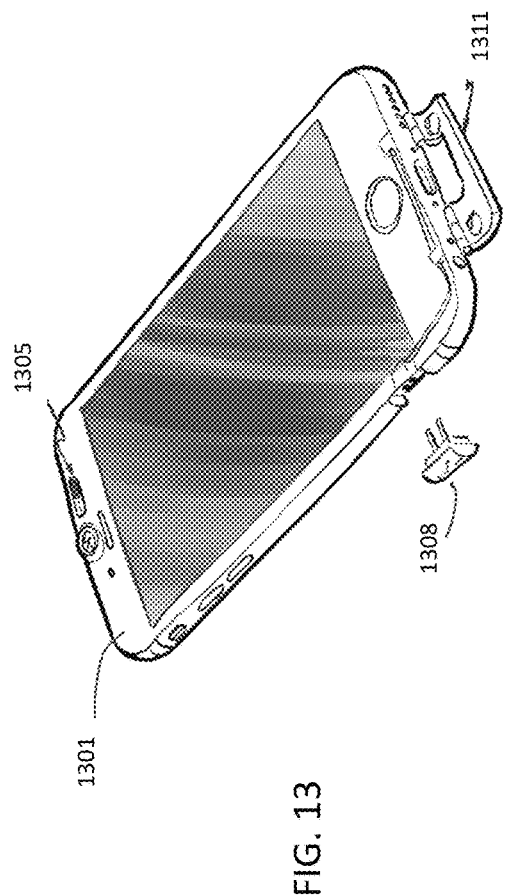
FIG. 13 illustrates ESAP features for a protected device in accordance with some embodiments of the invention.

FIG. 13 illustrates ESAP features for a protected device 1300 in accordance with some embodiments of the invention. Some embodiments include a removable jumper 1308 coupled to a jumper door that can be pulled to disconnect one or more sensor. Some further embodiments include a physical airplane-style switch similar to a mechanical switch 1205. Some embodiments include an on-off switch change between soft power and hard power. In reference to FIG. 14, some embodiments include device 1401 with hard-off relay 1405 connected to a Lightning® connector. In some embodiments, a set of pins can be added to the Lightning® connector that can activate the sensor-off condition.

Figure 15:
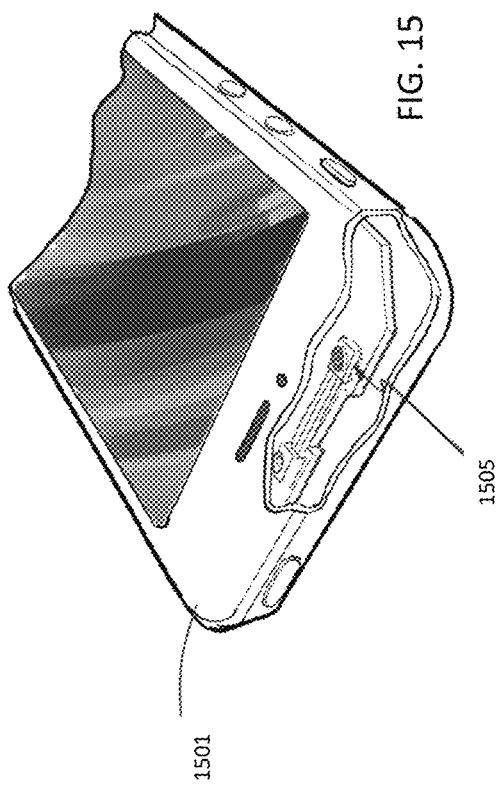
FIG. 15 illustrates an e-ink indicator in accordance with some embodiments of the invention.

Some embodiments include one or more indicators to provide a product-like functionality to alert the user when the sensors are communicating. For example, some embodiments include hardwire LEDs to microphones or cameras as a visual indicator of activity on the sensors. Some embodiments include a device 1501 with e-ink indicator 1505 for sensors and a low-power indicator for live sensors (e.g., see FIG. 15 illustrates an e-ink indicator in accordance with some embodiments of the invention.)

Figure 16:
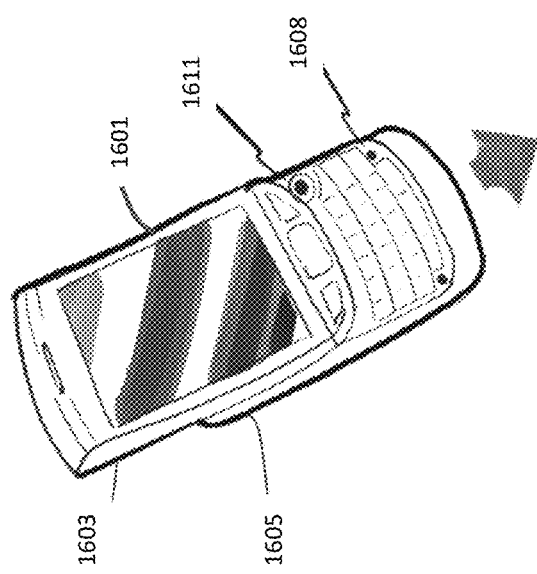
FIG. 16 illustrates an ESAP in accordance with some embodiments of the invention.
Figure 17:
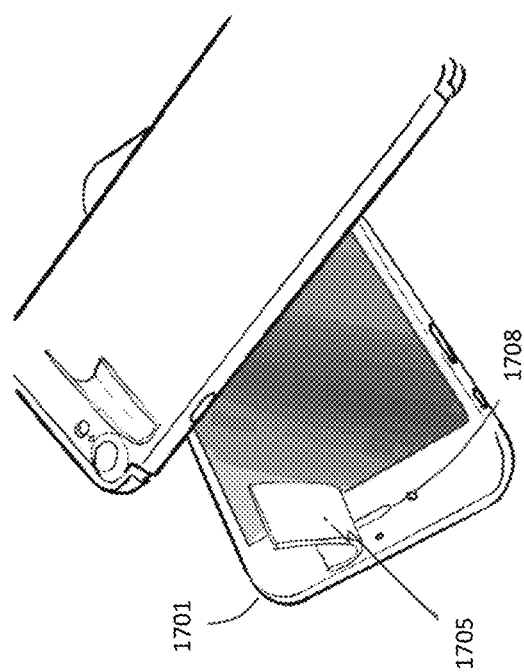
FIG. 17 illustrates an ESAP cover for a device in accordance with some embodiments of the invention.

Some embodiments include a mechanical shield. For example, referring to FIG. 16, some embodiments include a slide out keyboard style assembly 1605 of device 1601 that can be configured to hide the microphones 1608 and cameras 1611 in a sliding cover 1603. Referring back to FIG. 13, some embodiments include camera door 1305. Further, some embodiments include a window on the case of a device where a switch could be accessed. Some further embodiments include a flip tab microphone 1311 similar to a slide out microphone. Some further embodiments include a travel bag for acoustic, video and RF protection. In some further embodiments, sensors can be moved or placed at one end of the phone and then a small cover to shield them (cover 1008 of FIG. 10 described earlier). Other embodiments include a flip phone style create a folding phone that encases its own sensors. In reference to FIG. 17, some embodiments include self-adhesive stickers 1705 covering microphone port or sensor 1708 of device 1701.

In other embodiments, at least some degree of protection can be provided by a hard switch to an antenna, eliminating sensors and removing an IMU from the secure phones, Bluetooth® turn-off technology for protecting attached devices, electrostatically disable sensors, using Siri activated Siri to enable an off-mode. Siri® is a registered trademarks of Apple Inc. Other embodiments include induced noise by inductively coupling noise to the audio and video lines, and/or a feed source for canned video to replace actual video. Some other embodiments include turn on of a vibe motor use the phone's ring vibration to disrupt audio input to the device.

Any of the ESAP devices, components, assemblies, and systems disclosed here can be used with any microphones, cameras, antennas, and/or other sensors of a mobile device (e.g., such as a smart phone).

In some embodiments, a software interface can be provided to allow the control and/or actuation, activation/deactivation of one, more or all of the described approaches/methods for controlling, powering down, disconnecting or otherwise disabling and/or re-enabling sensors, antennas and/or other collection or communication capabilities in mobile phones, tablets or other devices, including microphones, cameras, antennas and/or other sensors. For example, a software button within an application or operating system can activate a physical disconnect switch or otherwise remove power or use some other such technique to deactivate and/or disable a sensor, antenna or other such collection device.

Some embodiments include a system for using a mobile device (e.g., phone, tablet etc.) as part of a distributed sensor system. In some embodiments the RF integrated circuits, modems, digital baseband and other hardware on the protected mobile phone or device (including, but not limited to, processors, DSPs, FPGAs, cameras, microphones, antennas, IMU's, motion sensors, gyroscopes, accelerometers and/or other such systems and sensors) can be used to detect, collect, process (including add, change or delete), store, communicate and/or analyze activity, behavior, movement, location, signals and other types of data. In some embodiments, the use of such capabilities can provide a single or multiple sensor platform with the ability to aggregate, process (including change, add to and/or delete), analyze, report and/or act upon the detected and/or gathered information, including information gathered from sources other than that of the local or associated sensors. In some embodiments, the mobile device can contain sensors for RF signals, environmental data and/or any other type of sensor. The data and/or information detected and/or collected by some or all of these sensors can be stored, processed, analyzed, reported and/or acted upon either locally or communicated or shared with associated and/or any protected device, systems, and/or remote, third parties, or distributed to centralized collection points or systems for similar or other purposes.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed.

The invention claimed is:

1. An apparatus for a portable communication device comprising:
   a. a housing assembly configured to at least partially attenuate at least one of acoustic and light energy, wherein the housing assembly is arranged to conform to the portable communication device;
   b. at least one audio channel comprising a microphone and a speaker at least partially supported by the housing assembly, wherein the speaker is arranged to output sound derived from an input primarily provided from either the microphone or from a different audio source; and
   c. a processor arranged to:
      i. receive the input from the microphone and provide the input to the speaker or process the microphone input prior to providing to the speaker; and
      ii. use a random seed value to generate a masking signal provided to the speaker in order to output masking sound that is played to one or more microphones of the portable communication device.

2. The apparatus of claim 1, further comprising an interface for a module, which provides additional capabilities for the apparatus.

3. The apparatus of claim 2, wherein the module comprises a subscriber identity module.

4. The apparatus of claim 1 further comprising a microprocessor provided to capture states of switches or buttons at least partially supported by the housing assembly.

5. The apparatus of claim 1 further comprising a microprocessor provided to capture battery status.

6. The apparatus of claim 1 further comprising a microprocessor provided to control at least one visual feedback system.

7. The apparatus of claim 1 further comprising a visual feedback system including at least one LED.

8. The apparatus of claim 1 further comprising one or more user actuated buttons, slides, or shutters configured to control a type of signal played to a least one microphone of the portable communication device.

9. The apparatus of claim 8, wherein the one or more user actuated buttons, slides, or shutters are configured to cover or uncover at least one camera on the portable communication device.

10. The apparatus of claim 1 further comprising at least one switch configured to detect a state of at least one shutter for a camera.

11. The apparatus of claim 10, wherein the at least one switch is further configured to automatically change the output sound derived from the input played to a microphone of the portable communication device.

12. The apparatus of claim 1 further comprising at least one LED to indicate a state of the apparatus.

13. The apparatus of claim 1 further comprising at least one wired or wireless connection configured to allow information to pass to or from the apparatus and the portable communication device.

14. The apparatus of claim 1 further comprising a mechanical or electrical connection configured and arranged for coupling at least one module to the apparatus, the mechanical or electrical connection enabling:
   i. power to pass to and/or from the at least one module and the apparatus; and
   ii. data to pass to and/or from the at least one module and the apparatus.

15. The apparatus of claim 14, wherein the at least one module utilizes the mechanical or electrical connection to couple one or more components of the apparatus to the at least one module.

16. The apparatus of claim 15, wherein the one or more components comprise one or more of:
   a. a blank module to fill an open space that may be taken by a module;
   b. a module configured to provide extra battery power to the portable communication device, the apparatus or to one or more separate devices; and
   c. a module to detect Radio Frequency transmissions.

17. The apparatus of claim 1, wherein the housing assembly includes an articulating assembly configured and arranged to articulate a portion of the housing assembly to one or more positions to enable a user to insert, enclose or remove the portable communication device.

18. The apparatus of claim 1, wherein the housing assembly includes a sliding assembly configured and arranged to slide a portion of the housing assembly to one or more positions to enable a user to insert, enclose or remove the portable communication device.

19. The apparatus of claim 1, wherein the housing assembly includes one or more separate and distinct parts or components, together which integrate and connect into a complete assembly enclosing the portable communication device.

20. The apparatus of claim 1 further comprising at least one microphone configured to listen to the mask sound generated by the apparatus.

21. The apparatus of claim 1, further comprising a microprocessor configured to set parameters of a battery charge system.

22. The apparatus of claim 1, further comprising a microprocessor configured to control a power state of one or more components of the apparatus.

23. The apparatus of claim 1, wherein the processor is configured to filter or sculpt audio, voice or mask noise to compensate for the microphone, the speaker and a cavity of the apparatus.

24. The apparatus of claim 1, wherein the processor is configured to analyze ambient audio to determine optimum mask profile.

25. The apparatus of claim 1, wherein the processor is configured to morph voice to obfuscate identity while maintaining intelligibility.

26. The apparatus of claim 1, wherein the processor is configured to apply a frequency mask.

* * * * *